(12) United States Patent
Ewing et al.

(10) Patent No.: US 11,784,491 B1
(45) Date of Patent: Oct. 10, 2023

(54) SYSTEMS AND METHODS FOR IMPLEMENTING VEHICLE CHARGING INFRASTRUCTURE

(71) Applicant: Geotab Inc., Oakville (CA)

(72) Inventors: Andrew Ewing, Kitchener (CA); Hani Hawari, Waterloo (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 17/981,614

(22) Filed: Nov. 7, 2022

Related U.S. Application Data

(60) Provisional application No. 63/389,560, filed on Jul. 15, 2022.

(51) Int. Cl.
*H02J 3/06* (2006.01)
*B60L 53/66* (2019.01)

(52) U.S. Cl.
CPC ............... *H02J 3/06* (2013.01); *B60L 53/66* (2019.02); *H02J 2203/20* (2020.01)

(58) Field of Classification Search
CPC ................................................ B60L 53/60–68
See application file for complete search history.

(56) References Cited

U.S. PATENT DOCUMENTS

| | | | |
|---|---|---|---|
| 7,333,880 B2 | 2/2008 | Brewster | |
| 8,766,594 B2 | 7/2014 | Götz | |
| 8,957,634 B2 | 2/2015 | Lo | |
| 9,007,027 B2 | 4/2015 | Prosser | |
| 9,235,825 B2 | 1/2016 | Shao | |
| 9,268,314 B2 | 2/2016 | Willig | |
| 9,283,863 B2 | 3/2016 | Eger | |
| 9,403,441 B2 | 8/2016 | Ashworth | |
| 9,783,068 B2 | 10/2017 | Eger | |
| 9,840,156 B2 | 12/2017 | Deboer, III | |
| 9,893,526 B2 | 2/2018 | Prosser | |
| 9,904,269 B2 | 2/2018 | Al-Mohssen | |
| 9,912,184 B2 | 3/2018 | Prosser | |
| 9,977,448 B2 | 5/2018 | Willig | |
| 10,150,380 B2 | 12/2018 | Vaughan | |
| 10,377,265 B2 | 8/2019 | Wytock | |
| 10,545,194 B2 | 1/2020 | Eldridge | |
| 10,647,209 B2 | 5/2020 | Haas | |
| 10,752,123 B2 | 8/2020 | Patil | |
| 11,267,356 B2 | 3/2022 | Bode | |
| 2015/0091505 A1* | 4/2015 | Hyde | B60L 53/665 320/108 |

(Continued)

FOREIGN PATENT DOCUMENTS

| | | | | |
|---|---|---|---|---|
| KR | 20120070651 A | * | 7/2012 | ............ B60L 53/66 |
| WO | WO-2014012249 A1 | * | 1/2014 | .......... B60L 11/1816 |

OTHER PUBLICATIONS

Machine translation of KR-20120070651-A (Year: 2023).*

*Primary Examiner* — David V Henze-Gongola
(74) *Attorney, Agent, or Firm* — Mark J. Pringle-Rigby

(57) ABSTRACT

Systems and methods for determining supply requirements for charging a plurality of vehicles are described. Based on real-world data for a plurality of vehicles, operation of comparable battery-powered vehicles is simulated. Energy consumption by the vehicles and energy replenishable to the vehicles is simulated, to determine power supply requirements or charge station requirements for candidate charge sites. Feasibility of implementing battery powered vehicles is assessed.

23 Claims, 7 Drawing Sheets

(56) References Cited

U.S. PATENT DOCUMENTS

| | | |
|---|---|---|
| 2015/0298565 A1* | 10/2015 | Iwamura ............... G06Q 10/04 701/22 |
| 2019/0061547 A1 | 2/2019 | Vargas-Reighley |
| 2020/0006944 A1 | 1/2020 | Fife |
| 2021/0070182 A1 | 3/2021 | Billmaier |
| 2021/0070186 A1 | 3/2021 | Miftakhov |
| 2021/0119482 A1 | 4/2021 | Lowenthal |
| 2021/0162881 A1 | 6/2021 | Baxter |
| 2021/0221247 A1 | 7/2021 | Daniel |
| 2021/0347269 A1 | 11/2021 | Kothavale |
| 2022/0024346 A1 | 1/2022 | Quattrini, Jr. |

* cited by examiner

SYSTEMS AND METHODS FOR IMPLEMENTING VEHICLE CHARGING INFRASTRUCTURE

PRIOR APPLICATION DATA

The present application claims priority to U.S. Provisional Patent Application No. 63/389,560, filed Jul. 15, 2022, titled "SYSTEMS AND METHODS FOR IMPLEMENTING VEHICLE CHARGING INFRASTRUCTURE", the entirety of which is incorporated herein by reference.

TECHNICAL FIELD

The present disclosure generally relates to systems and methods for implementing vehicle infrastructure, and in particular relates to implementing charging infrastructure for battery-powered vehicles.

BACKGROUND

Battery-powered vehicles (e.g. all-electric vehicles, hybrid electric vehicles, etc.) are a convenient and environmentally friendly means of transportation. A battery-powered vehicle includes at least one battery, which can be charged from an external power source or charging station, or by in-vehicle components like regenerative brakes. A battery-powered vehicle can alternately be called an "electric vehicle".

SUMMARY

According to a broad aspect, the present disclosure describes a method for determining supply requirements for providing energy to a plurality of vehicles at one or more candidate charge sites, the method comprising: for each vehicle in the plurality vehicles: identifying at least one dwell period of the vehicle; for each identified dwell period of the vehicle, determining a respective dwell location of the vehicle; identifying at least one chargeable-dwell period, by identifying at least one dwell period of the vehicle where a respective dwell location of the vehicle is at a candidate charge site of the one or more candidate charge sites; identifying at least one active period of the vehicle; for each active period of the vehicle, determining energy consumption by the vehicle as a battery-powered vehicle during the at least one active period of the vehicle; and determining energy replenishable to the vehicle during the at least one chargeable-dwell period; and for each candidate charge site of the one or more candidate charge sites: determining energy replenishable to vehicles during chargeable-dwell periods in which the respective dwell location of said vehicles is at the candidate charge site; and determining supply requirements for the candidate charge site to provide at least the determined energy replenishable to vehicles during chargeable-dwell periods in which the respective dwell location of said vehicles is at the candidate charge site.

For each candidate charge site of the one or more candidate charge sites: determining supply requirements for the candidate charge site may comprise determining a required power supply at the candidate charge site to provide the determined energy replenishable to vehicles during chargeable-dwell periods with respective dwell locations at the candidate charge site.

For each candidate charge site of the one or more candidate charge sites: determining supply requirements for the candidate charge site may comprise determining a peak power demand at the candidate charge site to provide the determined energy replenishable to vehicles during chargeable-dwell periods with respective dwell locations at the candidate charge site.

For each candidate charge site of the one or more candidate charge sites: determining supply requirements for the candidate charge site may comprise determining a maximum number of vehicles which simultaneously have chargeable-dwell periods with respective dwell locations at the candidate charge site.

For each vehicle in the plurality of vehicles: identifying the at least one dwell period of the vehicle may comprise identifying each dwell period of the at least one dwell period as being a respective period of time where the vehicle is stationary. The method may further comprise, for each vehicle in the plurality of vehicles, determining whether the vehicle is stationary based on vehicle data selected from a group of vehicle data consisting of: location data; acceleration data; and motion data. For each vehicle in the plurality of vehicles: determining a respective dwell location of the vehicle for each identified dwell period of the vehicle may comprise identifying the respective location of the vehicle where the vehicle is stationary based on location data received from the vehicle.

For each vehicle in the plurality of vehicles: identifying the at least one active period of the vehicle may comprise identifying each active period of the at least one active period as being a respective period of time where the vehicle is in use. The method may further comprise, for each vehicle in the plurality of vehicles, determining whether the vehicle is in use based on vehicle data selected from a group of vehicle data consisting of: location data; acceleration data; motion data; and vehicle system activation data.

The method may further comprise determining a respective location of at least one candidate charge site of the one or more candidate sites, by identifying a location where a plurality of dwell periods for at least a subset of the plurality of vehicles occur.

The method may further comprise receiving an indication of a respective location of at least one candidate charge site of the one or more candidate charge sites. Receiving an indication of a respective location of at least one candidate charge site of the one or more candidate charge sites may comprise receiving the respective location as user-provided input. Receiving an indication of a respective location of at least one candidate charge site of the one or more candidate charge sites may comprise receiving the respective location from a network device.

The method may further comprise, for each vehicle in the plurality of vehicles: identifying a first candidate charge site by identifying a first dwell location where the vehicle spends more time dwelling than at locations outside the first dwell location. The method may further comprise for each vehicle in the plurality of vehicles: identifying a second candidate charge site by identifying a second dwell location where the vehicle spends more time dwelling than at locations outside the second dwell location.

The method may further comprise, for each vehicle in the plurality of vehicles: identifying whether the energy replenishable to the vehicle compensates for the determined energy consumption by the vehicle as a battery-powered vehicle. 17. For each vehicle in the plurality of vehicles: identifying at least one active period of the vehicle and identifying at least one chargeable-dwell period of the vehicle may comprise: identifying an activity schedule for the vehicle which includes each chargeable-dwell period and each active period of the vehicle within a time frame; and identifying whether the energy replenishable to the vehicle compensates for the energy consumption by the vehicle as a battery-powered vehicle may comprise: determining whether energy replenishable to the vehicle during each chargeable-dwell period provides sufficient energy for at least one active period of the vehicle between chargeable-dwell periods. The activity schedule for the vehicle may be identified as further including each dwell period which is not a chargeable-dwell period.

The method may further comprise collecting, by a plurality of telematic monitoring devices respectively included in each vehicle of the plurality of vehicles, respective telematics data for each vehicle of the plurality of vehicles. For each vehicle in the plurality of vehicles, identifying at least one dwell period of the vehicle, determining a respective dwell location of the vehicle, identifying at least one chargeable-dwell period, identifying at least one active period of the vehicle, determining energy consumption by the vehicle as a battery-powered vehicle, and determining energy replenishable to the vehicle, may be based on the respective telematics data collected for each vehicle in the plurality of vehicles.

The method may further comprise collecting, by at least one sensor respectively integrated in each vehicle of the plurality of vehicles, respective telematics data for each vehicle of the plurality of vehicles. For each vehicle in the plurality of vehicles, identifying at least one dwell period of the vehicle, determining a respective dwell location of the vehicle, identifying at least one chargeable-dwell period, identifying at least one active period of the vehicle, determining energy consumption by the vehicle as a battery-powered vehicle, and determining energy replenishable to the vehicle, may be based on the respective telematics data collected for each vehicle in the plurality of vehicles.

For each vehicle in the plurality of vehicles, determining energy consumption of the vehicle as a battery-powered vehicle may comprise simulating operation of the vehicle as a battery powered vehicle. For each vehicle in the plurality of vehicles, simulating operation of the vehicle as a battery powered vehicle may comprise simulating operation of the vehicle based on real-world operational data collected from the vehicle. The real-world operational data collected from the vehicle may comprise data selected from a group of real-world operational data consisting of: distance travelled by the vehicle; elevation changes of the vehicle; acceleration events of the vehicle; deceleration events of the vehicle; and vehicle accessory systems activation data.

According to another broad aspect, the present disclosure describes a system for determining supply requirements for providing energy to a plurality of vehicles at one or more candidate charge sites, the system comprising: at least one processor; at least one non-transitory processor-readable storage medium communicatively coupled to the at least one processor, the at least one non-transitory processor-readable storage medium storing processor-executable instructions which when executed by the at least one processor, cause the system to: for each vehicle in the plurality vehicles: identify at least one dwell period of the vehicle; for each identified dwell period of the vehicle, determine a respective dwell location of the vehicle; identify at least one chargeable-dwell period, by identifying at least one dwell period of the vehicle where a respective dwell location of the vehicle is at a candidate charge site of the one or more candidate charge sites; identify at least one active period of the vehicle; for each active period of the vehicle, determine energy consumption by the vehicle as a battery-powered vehicle during the at least one active period of the vehicle; and determine energy replenishable to the vehicle during the at least one chargeable-dwell period; and for each candidate charge site of the one or more candidate charge sites: determine energy replenishable to vehicles during chargeable-dwell periods in which the respective dwell location of said vehicles is at the candidate charge site; and determine supply requirements for the candidate charge site to provide at least the determined energy replenishable to vehicles during chargeable-dwell periods in which the respective dwell location of said vehicles is at the candidate charge site.

For each candidate charge site of the one or more candidate charge sites: the processor-executable instructions which cause the system to determine supply requirements for the candidate charge site may cause the system to: determine a required power supply at the candidate charge site to provide the determined energy replenishable to vehicles during chargeable-dwell periods with respective dwell locations at the candidate charge site.

For each candidate charge site of the one or more candidate charge sites: the processor-executable instructions which cause the system to determine supply requirements for the candidate charge site may cause the system to: determine a peak power demand at the candidate charge site to provide the determined energy replenishable to vehicles during chargeable-dwell periods with respective dwell locations at the candidate charge site.

For each candidate charge site of the one or more candidate charge sites: the processor-executable instructions which cause the system to determine supply requirements for the candidate charge site may cause the system to: determine a maximum number of vehicles which simultaneously have chargeable-dwell periods with respective dwell locations at the candidate charge site.

For each vehicle in the plurality of vehicles: the processor-executable instructions which cause the system to identify the at least one dwell period of the vehicle may cause the system to: identify each dwell period of the at least one dwell period as being a respective period of time where the vehicle is stationary. The processor-executable instructions when executed may further cause the system to, for each vehicle in the plurality of vehicles, determine whether the vehicle is stationary based on vehicle data selected from a group of vehicle data consisting of: location data; acceleration data; and motion data. For each vehicle in the plurality of vehicles: the processor-executable instructions which cause the system to determine a respective dwell location of the vehicle for each identified dwell period of the vehicle may cause the system to: identify the respective location of the vehicle where the vehicle is stationary based on location data received from the vehicle.

For each vehicle in the plurality of vehicles: the processor-executable instructions which cause the system to identify the at least one active period of the vehicle may cause the system to: identify each active period of the at least one active period as being a respective period of time where the vehicle is in use. The processor-executable instructions when executed may further cause the system to, for each vehicle in the plurality of vehicles, determine whether the vehicle is in use based on vehicle data selected from a group of vehicle data consisting of: location data; acceleration data; motion data; and vehicle system activation data.

The processor-executable instructions when executed may further cause the system to determine a respective location of at least one candidate charge site of the one or more candidate sites, by identifying a location where a plurality of dwell periods for at least a subset of the plurality of vehicles occur.

The processor-executable instructions when executed may further cause the system to receive an indication of a respective location of at least one candidate charge site of the one or more candidate charge sites. The processor-executable instructions which cause the system to receive an indication of a respective location of at least one candidate charge site of the one or more candidate charge sites may cause the system to: receive the respective location as user-provided input. The processor-executable instructions which cause the system to receive an indication of a respective location of at least one candidate charge site of the one or more candidate charge sites may cause the system to: receive the respective location from a network device.

The processor-executable instructions when executed may further cause the system to, for each vehicle in the plurality of vehicles: identify a first candidate charge site by identifying a first dwell location where the vehicle spends more time dwelling than at locations outside the first dwell location. The processor-executable instructions when executed may further cause the system to, for each vehicle in the plurality of vehicles: identify a second candidate charge site by identifying a second dwell location where the vehicle spends more time dwelling than at locations outside the second dwell location.

The processor-executable instructions when executed may further cause the system to, for each vehicle in the plurality of vehicles: identify whether the energy replenishable to the vehicle compensates for the determined energy consumption by the vehicle as a battery-powered vehicle. For each vehicle in the plurality of vehicles: the processor-executable instructions which cause the system to identify at least one active period of the vehicle and identify at least one chargeable-dwell period of the vehicle may cause the system to: identify an activity schedule for the vehicle which includes each chargeable-dwell period and each active period of the vehicle within a time frame; and the processor-executable instructions which cause the system to identify whether the energy replenishable to the vehicle compensates for the energy consumption by the vehicle as a battery-powered vehicle may cause the system to: determine whether energy replenishable to the vehicle during each chargeable-dwell period provides sufficient energy for at least one active period of the vehicle between chargeable-dwell periods. The processor-executable instructions which cause the system to identify the activity schedule for the vehicle may cause the system to identify the activity schedule as further including each dwell period which is not a chargeable-dwell period.

The system may further comprise a plurality of telematic monitoring devices respectively included in each vehicle of the plurality of vehicles. The processor-executable instructions when executed may further cause the system to collect, by the plurality of telematic monitoring devices, respective telematics data for each vehicle of the plurality of vehicles; and the processor-executable instructions which cause the system to, for each vehicle in the plurality of vehicles, identify at least one dwell period of the vehicle, determine a respective dwell location of the vehicle, identify at least one chargeable-dwell period, identify at least one active period of the vehicle, determine energy consumption by the vehicle as a battery-powered vehicle, and determine energy replenishable to the vehicle, may be based on the respective telematics data collected for each vehicle in the plurality of vehicles.

The system may further comprise at least one sensor respectively integrated in each vehicle of the plurality of vehicles. The processor-executable instructions when executed may further cause the at least one sensor to collect respective telematics data for each vehicle of the plurality of vehicles; and the processor-executable instructions which cause the system to, for each vehicle in the plurality of vehicles, identify at least one dwell period of the vehicle, determine a respective dwell location of the vehicle, identify at least one chargeable-dwell period, identify at least one active period of the vehicle, determine energy consumption by the vehicle as a battery-powered vehicle, and determine energy replenishable to the vehicle, may be based on the respective telematics data collected for each vehicle in the plurality of vehicles.

The processor-executable instructions which cause the system to, for each vehicle in the plurality of vehicles, determine energy consumption of the vehicle as a battery-powered vehicle may cause the system to: simulate operation of the vehicle as a battery powered vehicle. The processor-executable instructions which cause the system to, for each vehicle in the plurality of vehicles, simulate operation of the vehicle as a battery powered vehicle may cause the system to: simulate operation of the vehicle based on real-world operational data collected from the vehicle. The real-world operational data collected from the vehicle may comprise data selected from a group of real-world operational data consisting of: distance travelled by the vehicle; elevation changes of the vehicle; acceleration events of the vehicle; deceleration events of the vehicle; and vehicle accessory systems activation data.

BRIEF DESCRIPTION OF THE DRAWINGS

A better understanding of the exemplary non-limiting embodiments (including alternatives and/or variations thereof) may be obtained with reference to the Detailed Description along with the accompanying Drawings, in which.

DETAILED DESCRIPTION

Figure 1:
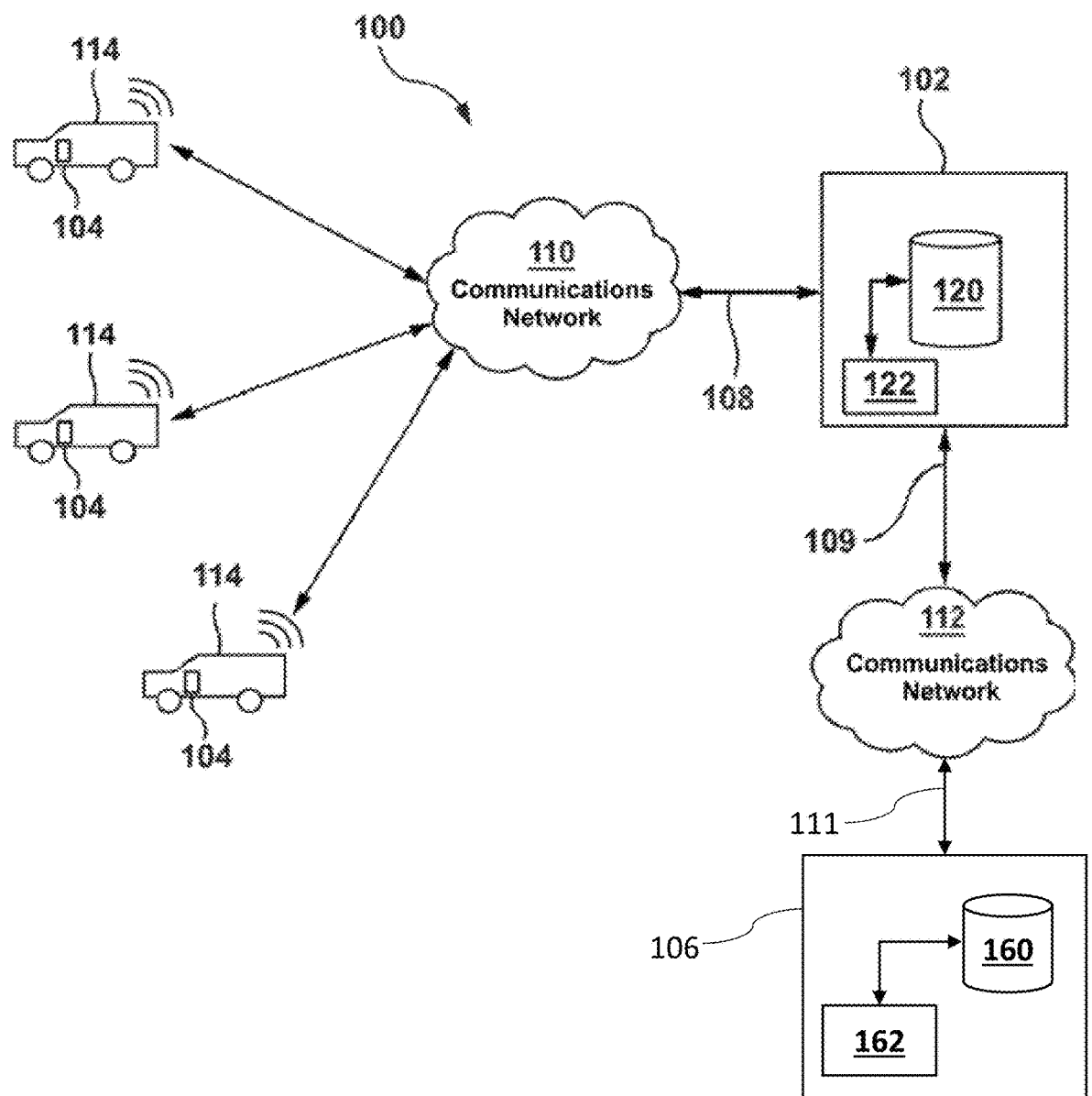
FIG. 1 is a schematic view of a system for managing data for a plurality of vehicles.

The present disclosure details systems, methods, and models for analyzing, determining, or planning infrastructure for charging battery-powered vehicles.

In a non-limiting exemplary use case, a manager of a fleet of vehicles may be interested in investing in battery-powered vehicles, for example to replace existing internal combustion engine (ICE) vehicles, or to supplement an existing fleet. Herein, systems and methods are described for determining supply requirements for providing energy to a plurality of vehicles at one or more candidate charge sites. In this context, a "plurality of vehicles" can have broad meaning. As one example, a fleet manager may wish to analyze feasibility and supply requirements for replacing an entire fleet of vehicles, such that the "plurality of vehicles" refers to the entire fleet of vehicles. As another example, a fleet manager may wish to analyze feasibility and supply requirements for replacing a subset of the fleet of vehicles, in which case the "plurality of vehicles" refers to the subset of vehicles under consideration. As yet another example, a fleet manager may wish to analyze feasibility and supply requirements for adding some new vehicles to the fleet which are battery-powered, in which case the "plurality of vehicles" refers to the number of new vehicles which are under consideration.

A "candidate charge site" is a location where energy can be provided to battery-powered vehicles, or which can be adapted to enable provision of energy to battery powered vehicles. As an example, a candidate charge site could be a depot, warehouse, or any other location where charge infrastructure (such as charge stations) can be installed. As another example, a candidate charge site could be a location which already has charging infrastructure, and is being analyzed for sufficiency to provide energy to vehicles (e.g. to determine how many battery-powered vehicles the candidate charge site could support, or determining required infrastructure upgrades to support a desired number of battery-powered vehicles).

To determine supply requirements, dwell periods of each vehicle are identified, along with respective dwell location where a vehicle dwells during a respective dwell period. Chargeable-dwell periods are identified by identifying dwell periods where a vehicle dwells at a candidate charge site (and thus is chargeable during the dwell period). Active periods of vehicles are also identified (periods where vehicles are in use), and energy consumption by vehicles during such active periods is determined. Further, energy replenishable to vehicles during chargeable-dwell periods is determined. For each candidate charge site, supply requirements are determined for providing energy replenishable to vehicles which dwell at the candidate charge site.

Telematics data for use in the methods or by the systems discussed herein can be collected by a telematics monitoring device in each vehicle of a plurality of vehicles, or by at least one sensor in each vehicle of the plurality of vehicles. A telematics system monitors a vehicle using an onboard telematic monitoring device for gathering and transmitting vehicle operation information. For instance, fleet managers can employ telematics to have remote access to real time operation information of each vehicle in a fleet. A vehicle may include a car, truck, recreational vehicle, heavy equipment, tractor, snowmobile or other transportation asset. A telematic monitoring device may detect environmental operating conditions associated with a vehicle, for example, outside temperature, attachment status of an attached trailer, and temperature inside an attached refrigeration trailer. A telematic monitoring device may also detect operating conditions of an associated vehicle, such as position, (e.g., geographic coordinates), speed, and acceleration, time of day of operation, distance traveled, stop duration, customer location, idling duration, driving duration, among others. Hence, the telematic monitoring device collects and transmits telematic data to the telematics system that is representative of the vehicle operation and usage execution. This data may be collected over a time period of sufficient duration to permit to allow for pattern recognition of the vehicle's operation. In an example the duration may be determined to be a number of days between 30 days and 90 days, though in practice any appropriate number of days could be implemented as the duration.

In an exemplary telematics system, raw vehicle data, including vehicle operation information indicative of a vehicle's operating conditions, is transmitted from an onboard telematic monitoring device to a remote subsystem, (e.g., data management system which may comprise a cloud system or a management system). Raw vehicle data may include information indicating the identity of the onboard telematic monitoring device (e.g., device identifier, device ID) and/or the identity of the associated vehicle the onboard telematic monitoring device is aboard. Specific and non-limiting examples of raw vehicle data includes device ID data, position data, speed data, ignition state data, (e.g. indicates whether vehicle ignition is ON or OFF), and datetime data indicative of a date and time vehicle operating conditions were logged by the telematic monitoring device. Raw vehicle data transmitted and collected over a period of time forms historical vehicle data which may be stored by the remote subsystem for future analysis of a single vehicle or fleet performance. In practice, a single fleet may comprise many vehicles, and thus large volumes of raw vehicle data (e.g., terabytes, petabytes, exabytes . . . ) may be transmitted to, and stored by, a remote subsystem.

In other exemplary telematics systems, a telematic monitoring device can have at least one processing unit thereon which processes or filters raw vehicle data, and transmits processed or filtered data. Such systems can reduce the bandwidth required for transmission and required storage capacity for transmitted data.

Illustrated in FIG. 1 is a simplified block diagram of an exemplary system 100 for gathering and storing vehicle operation information. System 100 comprises management device 102 having a first network interface 108 and onboard telematic monitoring devices 104 of vehicles 114 communicatively coupled therewith via communication network 110.

The management device 102 in an implementation comprises a management system which is a managed cloud data warehouse for performing analytics on data stored therein. In another implementation, the management system may comprise a plurality of management systems, datastores, and other devices, configured in a centralized, distributed or other arrangement. In some implementations, one or more different management systems may be employed and configured separately or in a centralized, distributed or other arrangement. In the illustrated example, management device 102 includes at least one non-transitory processor-readable storage medium 120 and at least one processor 122. The at least one non-transitory processor-readable storage medium 120 can store data on which analytics is performed, and/or can store instructions thereon. Said instructions, when executed by the at least one processor 122, cause the management device to perform the desired operations, analysis, or data collection/aggregation.

Communication network 110 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 110 may operate according to one or more communication protocols, such as, General Packet Radio Service (GPRS), Universal Mobile Telecommunications Service (UMTS), GSM, Enhanced Data Rates for GSM Evolution (EDGE), LTE, CDMA, LPWAN, Wi-Fi®, Bluetooth®, Ethernet, HTTP/S, TCP, and CoAP/DTLS, or other suitable protocol. Communication network 110 may take other forms as well.

System 100 may comprise another network interface 109 for communicatively coupling to another communication network 112. In an implementation, communication network 112 may comprise a communication gateway between the fleet owners and the system 100.

Also shown in FIG. 1 are vehicles 114, each thereof having aboard the onboard telematic monitoring devices 104. A vehicle may include a car, truck, recreational vehicle, heavy equipment, tractor, snowmobile, or other transportation asset. Onboard telematic monitoring devices 104 may transmit raw vehicle data associated with vehicles 114 through the communication network 110 to the management device 102.

Three telematic monitoring devices 104 are described in this example for explanation purposes only and embodiments are not intended to be limited to the examples described herein. In practice, a system may comprise many vehicles 114, such as hundreds, thousands and tens of thousands or more. Thus, huge volumes of raw vehicle data may be received and stored by remote management device 102.

In general, telematic monitoring devices 104 comprise sensing modules configured for sensing and/or measuring a physical property that may indicate an operating condition of a vehicle. For example, sensing modules may sense and/or measure a vehicle's position, (e.g., GPS coordinates), speed, direction, rates of acceleration or deceleration, for instance, along the x-axis, y-axis, and/or z-axis, altitude, orientation, movement in the x, y, and/or z direction, ignition state, transmission and engine performance, and times of operation among others. One of ordinary skill in the art will appreciate that these are but a few types of vehicle operating conditions that may be detected.

Telematic monitoring device 104 may comprise a sensing module for determining vehicle position. For instance, the sensing module may utilize Global Positioning System (GPS) technology (e.g., GPS receiver) for determining the geographic position (Lat/Long coordinates) of vehicle 114. Alternatively, the sensing module utilizes another a global navigation satellite system (GNSS) technology, such as, GLONASS or BeiDou. Alternatively, the sensing module may further utilize another kind of technology for determining geographic position. In addition, the sensing module may provide other vehicle operating information, such as speed. Alternatively, the telematic monitoring device 104 may communicate with a plurality of sensing modules for a vehicle.

In general, a vehicle 114 may include various control, monitoring and/or sensor modules for detecting vehicle operating conditions. Some specific and non-limiting examples include, an engine control unit (ECU), a suspension and stability control module, a headlamp control module, a windscreen wiper control module, an anti-lock braking system module, a transmission control module, and a braking module. A vehicle may have any combination of control, monitoring and/or sensor modules. A vehicle may include a data/communication bus accessible for monitoring vehicle operating information, provided by one or more vehicle control, monitoring and/or sensor modules. A vehicle data/communication bus may operate according to an established data bus protocol, such as the Controller Area Network bus (CAN-bus) protocol that is widely used in the automotive industry for implementing a distributed communications network. Specific and non-limiting examples of vehicle operation information provided by vehicle monitoring and/or sensor modules include, ignition state, fuel tank level, intake air temp, and engine RPM among others.

Telematic monitoring device 104 may comprise a monitoring module operable to communicate with a data/communication bus of vehicle 114. The monitoring module may communicate via a direct connection, such as, electrically coupling, with a data/communication bus of vehicle 114 via a vehicle communication port, (e.g., diagnostic port/communication bus, OBDII port). Alternatively, the monitoring module may comprise a wireless communication interface for communicating with a wireless interface of the data/communication bus of vehicle 114. Optionally, a monitoring module may communicate with other external devices/systems that detect operating conditions of the vehicle.

In some implementations, any of telematics monitoring devices 104 could be monolithically packaged (i.e. as a single device which is plugged into other otherwise installed in a respective vehicle 114). Alternatively, telematic monitoring device 104 may not be a single monolithic device, but may rather represent a plurality of components within a vehicle 114. For example, at least one sensor integrated within a vehicle 114 may collect telematics data, and provide this telematics data to a processor or communication interface of vehicle 114, for processing and/or communication to management device 102. Further, telematic monitoring device 104 may include components which are not dedicated to telematics. For example, sensors in a vehicle 114 can collect data which is used to display helpful information or warnings to a driver of the vehicle, and may also be transmitted to management device 102 for telematic purposes.

Telematic monitoring device 104 may be configured to wirelessly communicate with management device 102 via a wireless communication module. In some embodiments, telematic monitoring device 104 may directly communicate with one or more networks outside vehicle 114 to transmit data to management device 102. A person of ordinary skill will recognize that functionality of some modules may be implemented in one or more devices and/or that functionality of some modules may be integrated into the same device.

Telematic monitoring devices 104 may transmit raw vehicle data, indicative of vehicle operation information collected thereby, to management device 102. The raw vehicle data may be transmitted at predetermined time intervals, (e.g. heartbeat), intermittently, and/or according to other predefined conditions. Raw vehicle data transmitted from telematic monitoring devices 104 may include information indicative of device ID, position, speed, ignition state, and date and time operating conditions are logged, for instance, in an onboard datastore. One of ordinary skill in the art will appreciate that raw vehicle data may comprise data indicative of numerous other vehicle operating conditions.

Raw vehicle data may be transmitted from a monitoring device when a vehicle is moving, stationary, and during both ON and OFF ignition states.

FIG. 1 also illustrates an additional device 106 having a network interface 111 for communication via communications network 112. The additional device 106 in an implementation comprises another management system or device which is a data warehouse for performing analytics on data stored therein (similar to management device 102). In another implementation, the another management system may comprise a plurality of management systems, datastores, and other devices, configured in a centralized, distributed or other arrangement (similar to management device 102). In some implementations, one or more different management systems may be employed and configured separately or in a centralized, distributed or other arrangement as the additional device 106 (similar to management device 102). In the illustrated example, the additional device 106 includes at least one non-transitory processor-readable storage medium 160 and at least one processor 162. The at least one non-transitory processor-readable storage medium 160 can store data on which analytics is performed, and/or can store instructions thereon. Said instructions, when executed by the at least one processor 162, cause the management device to perform the desired operations, analysis, or data collection/aggregation.

Additional device 106 is described in a similar manner to management device 102, and these devices can comprise similar hardware or components. One difference between management device 102 and management device 106 is that the additional device 106 is a step removed from vehicles 114 (i.e. data from telematics monitoring devices 104 is provided to management device 102, and in turn can be provided to device 106). This illustrates that while management device 102 can perform more direct management of data from telematic monitoring device 104, and possibly management of vehicles 114, collected data can also be provided to another device (device 106) for analysis and use. In this sense, additional device 106 is optional in the context of system 100.

Figure 2:
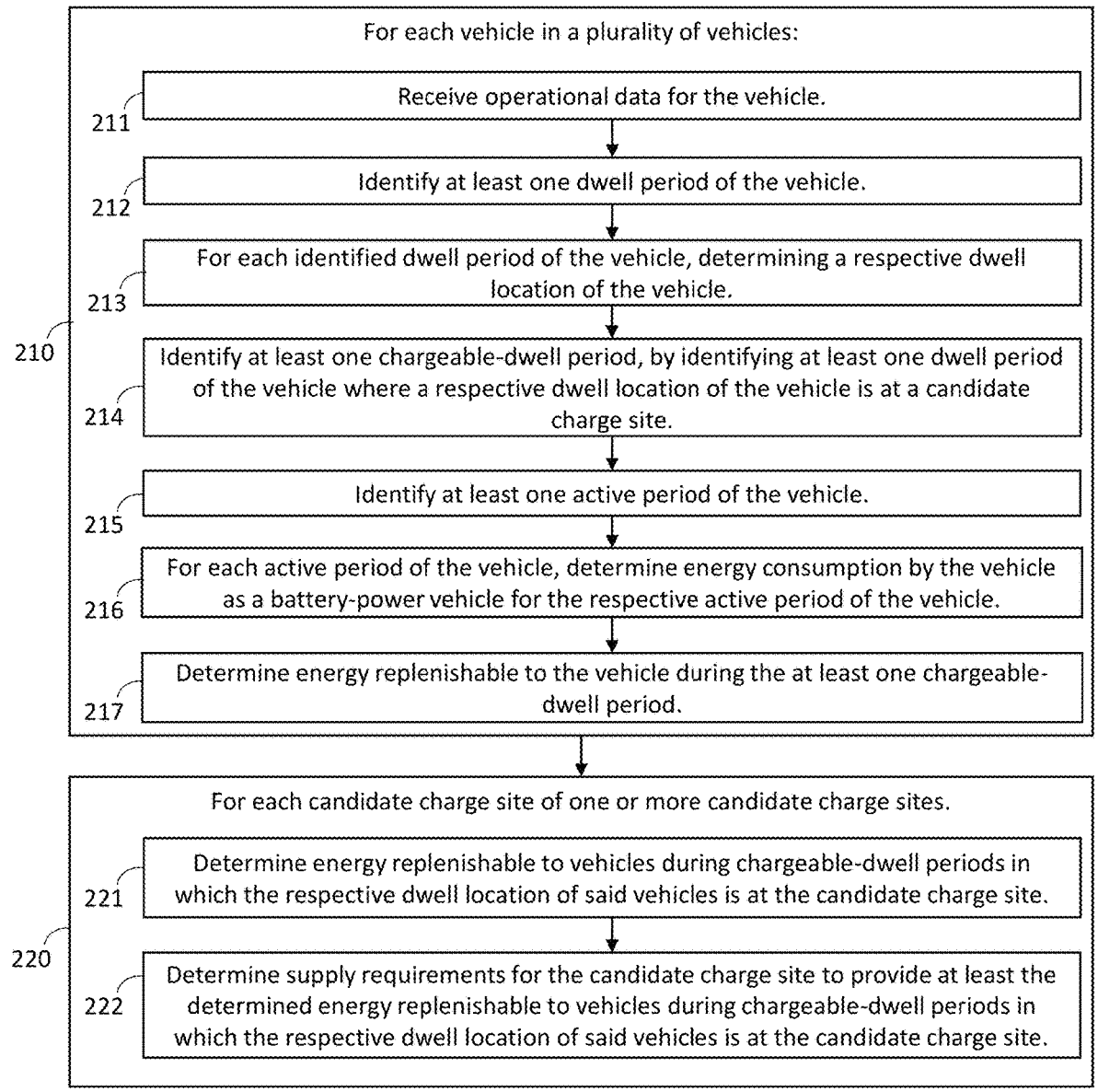
FIG. 2 is a flowchart diagram which illustrates an exemplary method for determining supply requirements for a candidate charge site.

FIG. 2 is a flowchart diagram which illustrates an exemplary method 200 for determining supply requirements for providing energy to a plurality of vehicles at one or more candidate charge sites. Method 200 as illustrated includes acts 210 related to single vehicles or each vehicle in a plurality of vehicles, and acts 220 related to single or each candidate charge site of one or more candidate charge sites. Acts 210 as illustrated include acts 211, 212, 213, 214, 215, 216, and 217; acts 220 as illustrated include acts 221 and 222. One skilled in the art will appreciate that additional acts could be added, acts could be removed, or acts could be reordered as appropriate for a given application. With reference to the example illustrated in FIG. 1, acts can be performed by appropriate components of a system such as system 100 in FIG. 1. For example, acts of identification or determination can be performed by at least one appropriate processor such as processor 122 of management device 102 or processor 162 of device 106. Further, at least one non-transitory processor-readable storage medium, such non-transitory processor-readable storage medium 120 of management device 102 or non-transitory processor-readable storage medium 160 of device 106, could have instructions stored thereon, which when executed by a respective at least one processor (e.g. processor 122 or processor 162) cause the system (e.g. management device 102 or device 106) to perform a given act of method 200.

At 211, real-world operational data for each vehicle is received. Such operational data could be collected by at least one respective sensor or a respective telematics device as discussed above with reference to FIG. 1. As mentioned earlier, such sensors could be built into or integrated with a respective vehicle, or could be part of a telematics monitoring device equipped to the vehicle. Operational data can include data related to operation of the vehicle, such as location data, acceleration data, motion data, speed data, elevation data, vehicle systems activation data (e.g. driving systems such as engine or motor data, auxiliary systems such as cabin conditioning, infotainment, or any other vehicles systems data). Operational data can include any telematics data, such as telematics data as discussed above with reference to FIG. 1. Each of the determinations and identifications made in subsequent acts of method 200 (including acts 212, 213, 214, 215, 216, 217, 221, and 222) can be directly or indirectly based on the received operational data and/or telematics data.

At 212, at least one dwell period of the vehicle is determined. Throughout this disclosure, "dwell period" refers to a period of time in which a vehicle is stationary (dwelling). This could be determined in multiple ways as discussed below.

In an exemplary implementation, a dwell period is determined based on location data for a vehicle. In particular, when a vehicle is dwelling at a location, location data for that vehicle should indicate no change in position for the vehicle over multiple sequential instances of location data over a period of time. An "instance" of location data refers to a piece of location data for a given moment in time; that is, data which indicates a location of the vehicle at a particular time. The location data indicating "no change in position" for the vehicle is not necessarily a literal requirement, but rather refers to the location data indicating a minimal change in position of the vehicle which is interpreted as the vehicle not moving. Due to location determination, collection, or communication errors, a reported location of the vehicle can shift or drift between instances of location data even if the vehicle is stationary, such that the apparent location of the vehicle may appear to be moving over time, or such that an occasional instance or instances of location data may be significantly incorrect. Clustering algorithms can be used to address such issues, for example by identifying a collection of location data instances which are close together as corresponding to a dwell period of the vehicle at a location indicated by the location data instances (e.g. an average or center location of the instances). Further, data cleaning algorithms could be used to ignore or delete certain instances of location data which are outside reasonable expectations. As an example, if location data indicates a sudden move from one location to another in a very short time frame, such that a vehicle could not reasonably travel between the two locations in the time frame, one of the instances of location data can be ignored or dropped as an erroneous piece of data.

In another exemplary implementation, dwell periods could be identified based on inertial or kinetic data, for example data collected by an inertial measurement unit, accelerometer, or other appropriate sensor of a vehicle or telematics monitoring device. In this example, if inertial or kinetic data for the vehicle indicates that the vehicle is stationary (not moving), this can be identified as the vehicle dwelling.

In another exemplary implementation, systems data for a vehicle can be used to identify a dwell period of a vehicle. For example, systems data for a vehicle can indicate whether an engine of the vehicle is on or off, or can indicate an ignition state of the vehicle. In this example, if an engine of the vehicle is off, or an ignition state of the vehicle is off, this can be identified as the vehicle dwelling.

Identification of dwell periods is not limited to being based on a single type of data (although it can be in some implementations). Rather, in some implementations, multiple data types can be utilized together to provide a more accurate determination of where a vehicle is dwelling, when the vehicle starts dwelling, and when the vehicle stops dwelling. In one exemplary implementation, location data is used to identify a candidate dwell period of the vehicle in the manner described earlier. Inertial data, kinetic data, or systems data for the vehicle can then be used to verify dwelling of the vehicle, or to determine specifically when the vehicle starts dwelling or stops dwelling, in the manner discussed earlier.

At 213, for each identified dwell period of the vehicle, a respective dwell location of the vehicle is determined. In an exemplary implementation, based on location data for the vehicle, a location at which the vehicle is positioned during the dwell period is determined as the respective dwell location. In cases where the location data shifts or drifts as described above, a location of the vehicle for a dwell period could be determined by combining or fusing locations for a plurality of instances of location data. For example, a location of the vehicle can be identified as the average location indicated by all valid points of location data through the dwell period. In this context, "valid" location data refers to location data which is deemed reasonably possible (e.g. location data which is not ignored or discarded as being erroneous, as discussed earlier). Such an average could be weighted as needed, for example if instances of location data are sporadically collected, it may be preferable to reduce weighting of instances of location data which are closer in time than others.

At 214, at least one chargeable-dwell period is identified, by identifying at least one dwell period where a respective dwell location of the vehicle is at a candidate charge site. That is, dwell locations for the vehicle are compared to a location of at least one candidate charge site (or zones or boundaries which encompass a candidate charge site). For dwell locations which are at, within, or proximate a candidate charge site, the dwell period is identified as a chargeable-dwell period. In this context, "chargeable-dwell period" refers to a dwell period where charging of the vehicle is possible (or would be possible with sufficient implementation of charging infrastructure), as discussed earlier.

At 215, at least one active period of the vehicle is identified. In this context, an "active period" refers to a period where energy stored for the vehicle is consumed. For example, if the vehicle were a battery-powered vehicle, active periods are periods in which a battery of the vehicle is drained. An exemplary type of active period is a period where the vehicle is being operated, for example to drive from one location to another. Another exemplary type of active period is a period where at least one system of the vehicle is running, even if the vehicle is not moving (e.g. running of vehicle cabin heating or cooling systems, running of vehicle lights, running of infotainment systems, running of other auxiliary or accessory system, or running of any other pertinent vehicle systems). Active periods of a vehicle can be identified in multiple ways; some examples are described below.

In an exemplary implementation, an active period is determined based on location data for a vehicle. In particular, when a vehicle is moving, location data for that vehicle indicates change in position for the vehicle over multiple instances of location data over a period of time. In this context, the location data indicating "change in position" for the vehicle is not necessarily a literal requirement, but rather refers to the location data indicating a significant or meaningful change in position of the vehicle which is interpreted as the vehicle moving. As discussed earlier with reference to identifying dwell periods based on location data, a reported location of the vehicle can shift or drift between instances of location data, or occasional instances of location data may be significantly incorrect. To prevent such shift, drift, or incorrect instances of data, scrutiny can be applied to location data in identifying active periods. As one example, for a vehicle to be considered as "moving", a distance threshold can be compared to differences between location of the vehicle as indicated in location data over a period of time; if the distance threshold is met or exceeded, the vehicle can be considered as "moving". Further, as discussed earlier, data cleaning algorithms could be used to ignore or delete certain instances of location data which are outside reasonable expectations. As an example, if location data indicates a sudden move from one location to another in a very short time frame, such that a vehicle could not reasonably travel between the two locations in the short time frame, one of the instances of location data can be ignored or dropped as an erroneous piece of data, to prevent incorrect interpretation as an "active" period.

In another exemplary implementation, active periods could be identified based on inertial or kinetic data, for example data collected by an inertial measurement unit, accelerometer, or other appropriate sensor of a vehicle. In this example, if inertial or kinetic data for the vehicle indicates that the vehicle is moving, this can be considered as the vehicle being active.

In another exemplary implementation, systems data for a vehicle can be used to identify an active period of a vehicle. For example, systems data for a vehicle can indicate whether an engine of the vehicle is on or off, or can indicate an ignition state of the vehicle. In this example, if an engine of the vehicle is on, or an ignition state of the vehicle is off, this can be considered as the vehicle being active.

Identification of active periods is not limited to being based on a single type of data (although it can be in some implementations). Rather, in some implementations, multiple data types can be utilized together to more accurately determine an active period of the vehicle. In one exemplary implementation, location data is used to identify a candidate active period of the vehicle in the manner described earlier. Inertial data, kinetic data, or systems data for the vehicle can then be used to verify activity of the vehicle, or to determine specifically when the vehicle starts being active or stops being active, in the manner discussed earlier.

In some circumstances, active periods and dwell periods are exclusive to each other. For example, active periods where a vehicle is moving are mutually exclusive to dwell periods where a vehicle is stationary. However, in other circumstances, active periods and dwell periods are not necessarily exclusive to each other. For example, active periods where auxiliary systems of a vehicle are in use, but the vehicle is not moving, can coincide with dwell periods of a vehicle. Taking this further, if auxiliary systems of a vehicle are in use, and the vehicle is stationary at a candidate charge site, the vehicle can be identified as simultaneously having a active period and a chargeable-dwell period. In such a case, energy can be consumed by the vehicle simultaneously while a battery of the vehicle is being charged. Such simultaneous energy consumption and charging can be accounted for in determining energy replenishable to the vehicle, as is discussed in more detail later with reference to acts 216 and 217.

In determining any of the periods discussed herein (dwell periods, chargeable-dwell periods, or active periods), accuracy of the period can be refined as desired (i.e., when the period starts and when the period ends). In an exemplary implementation, in determining periods based on location data, there can be a requirement for a certain number of instances of location data, or a certain length of time for location data, where the location data must be indicative of the nature of the period before the period is identified. This is discussed below with reference to FIG. 3.

Figure 3:
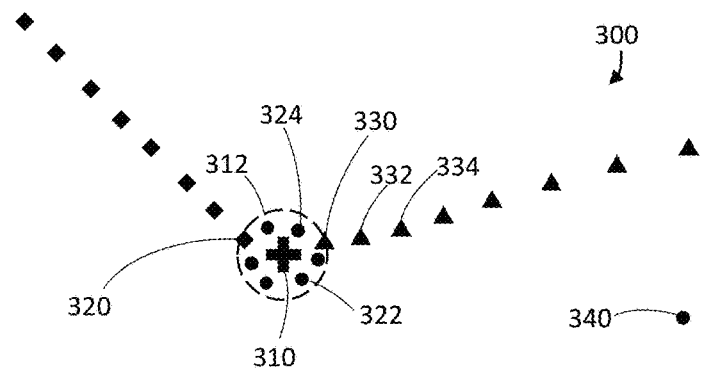
FIG. 3 is a top view of a scenario including a plurality of instances of location data.

FIG. 3 is a top view of a plurality of instances of location data. FIG. 3 is not drawn to scale, but is rather proportioned in order to provide clarity to the features shown therein. FIG. 3 illustrates an exemplary scenario 300 where a vehicle travels to a dwell location 310, dwells there for a time, then travels away from the dwell location 310. Dwell location 310 is shown by a cross symbol, and represents an actual dwell location of the vehicle during the dwell period. Instances of location data are shown with three different symbols: diamond symbols show location data for when the vehicle is approaching the dwell location 310; circle symbols show location data for when the vehicle is dwelling at the dwell location 310; and triangle symbols show location data for when the vehicle is travelling away from the dwell location 310. The difference in symbol shapes is intended to provide visibility into what the vehicle is doing at a given instance; the shape of the symbol does not mean that the type or format of the location data is different from location data represented by other shapes. A distance 312 is also shown which indicates a distance threshold, within which location data for the vehicle is interpreted to indicate that the vehicle is dwelling as discussed below.

As mentioned above, location data is sometimes prone to shift, drift, or errors, such that location data may indicate changes in a position of the vehicle even if the vehicle is not moving. In the illustrated implementation, location data presented by circles inside of distance threshold 312 is clustered together, and can be averaged, aggregated, or otherwise combined to determine a location of the vehicle which closely approximates dwell location 310. Location data 340, despite being collected while the vehicle is dwelling at dwell location 310, is erroneous, and represents an unreasonable departure from sequential instances of location data. As such, location data 340 can be dropped, deleted, or ignored.

Because of shift, drift, or errors in location data, in some cases a requirement can be implemented where a set number of instances of location data, or a set length of time must pass, where the location data indicates a type of period, before an identification of period is made. In an example of a dwell period, a requirement can be implemented that a set number of instances of location data, or a set length of time, where the location data indicates that the location of the vehicle is stationary (the vehicle is dwelling), before the period is identified as a "dwell" period. In one scenario, at least 10 instances of location data and/or 2 minutes of the vehicle location being stationary may be required before the vehicle is identified as dwelling. As for an active period, a requirement can likewise be implemented for a set number of instances of location data, or a set length of time, where the location data indicates that the location of the vehicle is moving, for the following period to be identified as an active period. In one scenario, at least 10 instances of location data and/or 30 seconds of the vehicle location moving may be required before the vehicle is considered to be active. Such requirements help to prevent misidentification of periods.

FIG. 3 illustrates sequential instances of location data 320, 322 and 324 where the vehicle arrives at and dwells at location 310. In one example, a requirement can be implemented that at least three instances of location data must indicate that the vehicle is not moving before the vehicle is identified as dwelling. In such an example, even though the vehicle arrives at dwell location 310 at instance 320, the vehicle is only identified as dwelling at instance 324, the third instance of location data which indicates the vehicle is not moving (in this example, is within distance threshold 312). Requiring three instances of location data to indicate dwelling of the vehicle is merely exemplary, and any number of instances of location data may be set as a requirement, as appropriate for a given application. In one example, if location data is reported once every minute (each instance of location data is one minute apart), then three instances of location data which indicate that the vehicle is dwelling can be appropriate, because that would mean the vehicle has been stationary for approximately three minutes. Conversely, if location data is reported once every second, then three instances of location data which indicate that the vehicle is dwelling may not be appropriate, because that would mean the vehicle has only been stationary for approximately three seconds, and could correspond to a brief stop or even a location data error.

FIG. 3 also illustrates sequential instances of location data 330, 332, and 334 where the vehicle moves away from location 310. In one example, a requirement can be implemented that at least three instances of location data must indicate that the vehicle is moving before the vehicle is identified as moving. In such an example, even though the vehicle is leaving dwell location 310 at instance 330, the vehicle is only identified as moving at instance 334, the third instance of location data which indicates that the vehicle is moving (in this example, is outside of distance threshold 312). Requiring three instances of location data to indicate movement of the vehicle is merely exemplary, and any number of instances of location data may be set as a requirement, as appropriate for a given application. Similar to as discussed above, if location data is reported once every minute (each instance of location data is one minute apart), then three instances of location data which indicate that the vehicle is moving can be appropriate, because that would mean the vehicle has been moving for approximately three minutes. Conversely, if location data is reported once every second, then three instances of location data which indicate that the vehicle is moving may not be appropriate, because that would mean the vehicle has only been moving for approximately three seconds, which could merely indicate a location data error.

FIG. 3 also illustrates a stray instance of location data 340, which occurs while the vehicle is dwelling at location 310. Instance 340 is an example of a data anomaly or error, which could occur for example due to location sensor issues, connectivity issues, location determination issues, or other reasons. In this example, instance 340 could reasonably be travelled by the vehicle (e.g., instance 340 could be 100 meters from location 310, and instances of location data can be reported a minute apart; it is reasonable for a vehicle to travel 100 m in one minute). However, by requiring a set number of instances of data to indicate movement of the vehicle, instance 340 can be prevented from triggering an identification of an active period, because instance 340 is only one instance of location data which indicates movement of the vehicle.

In some implementations, the precise time limits of the period may be identified as corresponding to the time where any requirements were met to identify the period. In cases where a set number of instances of data, or a set length of time of data must indicate in favor of an identification of the period, the start of the period can be determined as the time when the required set number of instances of data or set length of time of data indicates in favor of the period. In the examples above where three instances of data are required which indicate a certain type of period for the period to be identified, the start of the period can be identified as beginning at the third of said instances of data. In the particular examples outlined earlier, a dwell period can be identified as beginning at instance 324, and an active period can be identified as beginning at instance 334.

In other implementations, the precise time limits of the period may be identified as corresponding to the time where transitioning to the period began. In cases where a set number of instances of data, or a set length of time of data must indicate in favor of an identification of the period, the start of the period can be determined as the time of the first instance of data where the activity or dwelling of the vehicle indicated in favor of the period. That is, when a required set number of instances of data or set length of time of data indicates in favor of the period, the first instance of said data can be considered as the start of the period. In the particular examples outlined earlier, a dwell period can be identified as beginning at instance 320, and an active period can be identified as beginning at instance 330.

In some implementations, the precise start or end time of periods may not be important, and start or end times can be rounded. In one exemplary implementation, periods may be identified to the nearest 15 minutes. In such an implementation, start and end times of periods are rounded to align to the nearest 15 minutes. Rounding to 15 minutes is merely an illustrative example, and any appropriate rounding time can be implemented, such as 1 minute, 5 minutes, 10 minutes, 30 minutes, or 60 minutes, or any other amount of time.

The discussion of FIG. 3 is directed to location data as an example, but is applicable to other types of data, such as acceleration data, motion data, velocity data, vehicle systems data, or any other appropriate type of data. That is, regardless of the type of data which is used to identify dwell periods or active periods, a set number of instances of data, or a set amount of time of data, can be required to occur before an identification of a period is made.

Figure 4:
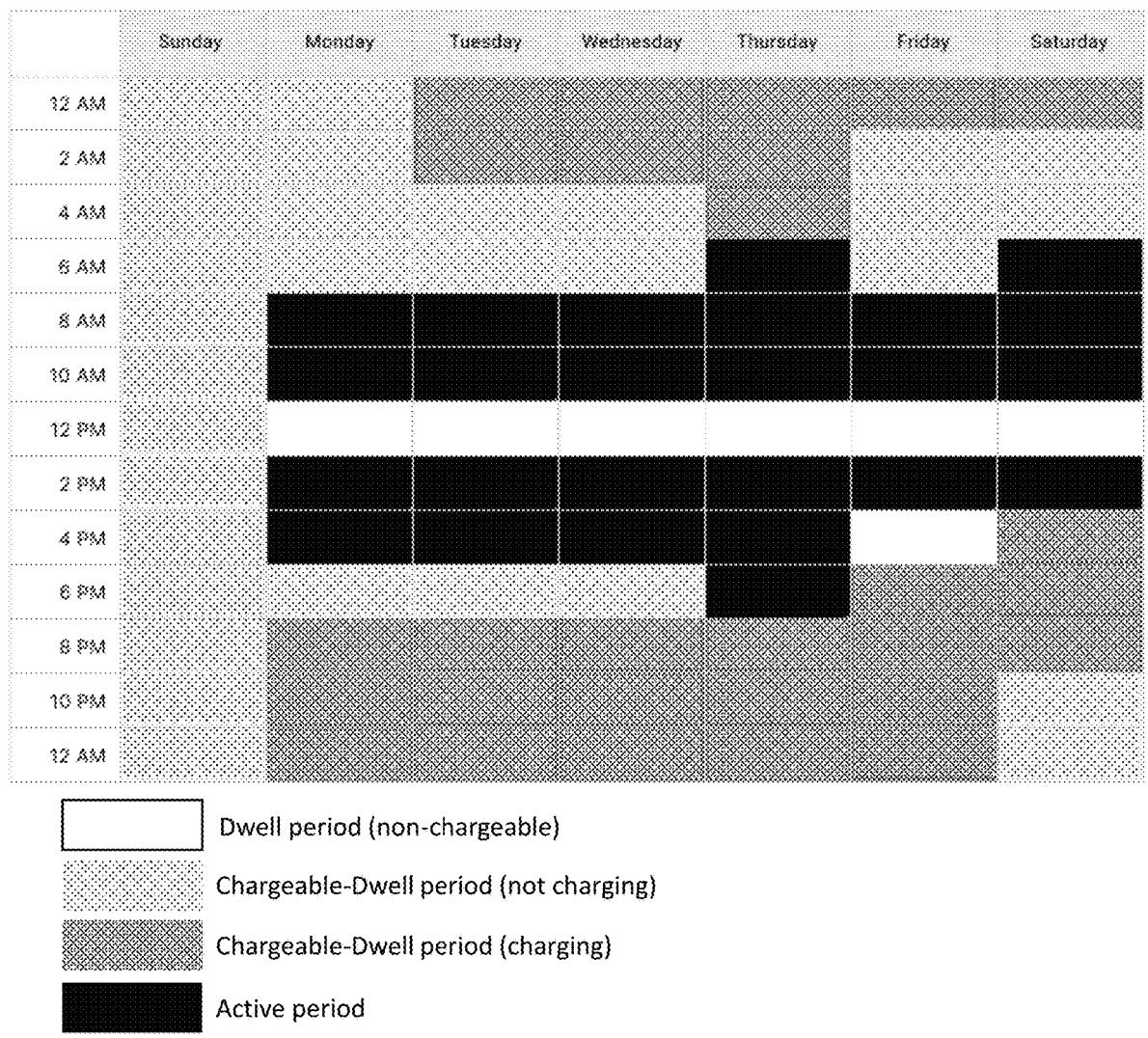
FIG. 4 illustrates an exemplary activity schedule for a vehicle.

FIG. 4 illustrates an exemplary activity schedule for a particular vehicle, which indicates dwell periods, chargeable-dwell periods, and active periods. As can be seen in FIG. 4, periods in this example are rounded to the nearest two-hour interval, though any interval could be used as appropriate for a given application. The schedule shown is a weekly activity schedule for the vehicle, though in other applications an activity could be identified for a longer or shorter time frame. By identifying, for each two-hour interval in the week, whether the vehicle is dwelling or active, and when the vehicle is dwelling at a candidate charge site, as discussed above, the schedule of FIG. 4 can be populated with dwell periods, chargeable dwell periods, and active periods as shown. FIG. 4 also illustrates two types of chargeable-dwell periods: one type where the vehicle is dwelling at a candidate charge site but is not charging, and another type where the vehicle is dwelling at a candidate charge site and is charging. The distinction between these chargeable-dwell periods is discussed below with reference to acts 216 and 217 of method 200.

Returning to method 200 in FIG. 2, at 216, for each active period of the vehicle, energy consumption by the vehicle as a battery-powered vehicle is determined for the respective active period of the vehicle. In particular, the vehicle in question can be a non-battery powered vehicle (such as an internal combustion engine vehicle), but operation of the vehicle is simulated or approximated as if the vehicle where a battery-powered vehicle, to determine or estimate energy consumption by such a battery powered vehicle. Techniques for simulating or estimating energy consumption by a vehicle are described in detail in U.S. Pat. No. 8,543,287 and U.S. Provisional Patent Application No. 62/323,210, which are incorporated by reference herein in their entirety. In some implementations, simulation of operation of the vehicle as a battery powered vehicle entails simulating a specific make and/or model of battery powered vehicle. Such a simulation can account for weight of the vehicle model, energy capacity of a battery of the vehicle model, typical energy consumption of the vehicle model under specified operating conditions, or any other appropriate data. Simulation operation of the vehicle can include identifying at least one route travelled by the vehicle (e.g. based on location data from the vehicle) during the respective active period, and determining energy consumption by a battery-powered vehicle to drive the same route. Simulation can also account for how the vehicle was operated, for example how the vehicle was accelerated and decelerated, whether auxiliary or accessory systems of the vehicle were active, or any other vehicle data as appropriate for a given application. Such simulation can be based on any appropriate data, such as data from inertial or kinetic sensors at the vehicle, or systems data which indicates operation of system of the vehicle. Generally, the more data from the vehicle used, and the more aspects of vehicle usage simulated, the more accurate a simulation of energy consumption by a vehicle as a battery-powered vehicle will be.

At 217, energy replenishable to the vehicle during the at least one chargeable-dwell period is determined. In this context, "energy replenishable" refers to capacity of the vehicle for replenishment of energy, and to the capabilities of a charge site to provide energy replenishment to the vehicle. For example, a simulated charge rate could be chosen (e.g. based on available power at a candidate charge site), and the simulated charge rate could be applied over the duration of the chargeable-dwell period (or at least as long as the vehicle battery requires to fully charge). As an example, the simulated charge rate could be multiplied by the duration of a chargeable-dwell period, to determine total energy replenishable over the charge period. As another example, for each hour (or other appropriate time delineation) that a vehicle is in a chargeable-dwell period, add the charge rate of the vehicle for the time delineation (e.g. energy per hour) to a simulated energy accumulator for the vehicle, until the vehicle battery is determined as full.

One way to implement acts 216 and 217 of method 200 is by tracking simulated energy consumption and simulated energy replenishment to a vehicle with an energy accumulator for the vehicle. This is shown in FIG. 5 and discussed below.

Figure 5:
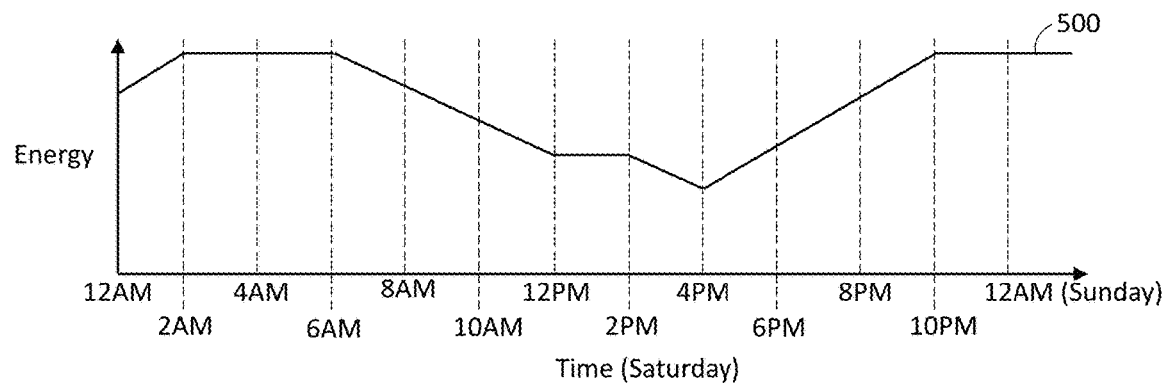
FIGS. 5 and 6 are plot diagrams for simulated energy accumulator curves for a vehicle, in at least two exemplary scenarios.

FIG. 5 is a plot diagram which shows an energy accumulator curve 500, which tracks energy consumption and energy replenishment to a vehicle simulated as a battery powered vehicle. In the illustrated example, energy curve 500 corresponds to energy consumed and replenished by the vehicle corresponding to the schedule shown in FIG. 4, for Saturday.

At 12 AM, the vehicle is in a chargeable-dwell period, and a battery of the vehicle is not fully charged, and energy replenishment to the vehicle is simulated until 2 AM, at which point the battery of the vehicle is fully charged. Throughout this disclosure, reference to a battery being "full" or "fully charged" can refer to the battery storing the maximum possible energy storable by the battery. However, this is not necessarily the case, and in alternative implementations "full" or "fully charged" refers to the battery storing a maximum intended amount of energy. Charging a battery to a maximum possible amount of stored energy can damage the battery or cause premature degradation; this can be reduced or avoided by limiting a maximum level to which the battery is charged, and this is what is meant by a "maximum intended amount" of energy. As a non-limiting example, in some vehicles charging of a vehicle battery is limited such that the battery is only charged to 80% of the maximum possible amount of stored energy. In this example, the maximum intended amount of energy is the 80% of the maximum possible amount of stored energy, and the battery is considered "full" or "fully charged" at this maximum intended amount of energy. Other intended amounts of energy can be set, as appropriate for a given vehicle, battery, or implementation.

From 2 AM to 6 AM, the vehicle is still in a chargeable-dwell period, but the battery of the vehicle is full, and thus no further charging occurs. As a result, the "energy replenishable" to the vehicle battery during a chargeable-dwell period from 12 AM to 6 AM corresponds to the amount of energy replenished from 12 AM to 2 AM.

From 6 AM to 12 PM, the vehicle is in an active period, and energy consumption of the vehicle is determined as in act 216 and shown in curve 500.

From 12 PM to 2 PM, the vehicle is in a non-chargeable-dwell period. That is, the vehicle is dwelling, but charging of the vehicle cannot or does not occur. As such, energy curve 500 is unchanged from 12 PM to 2 PM.

From 2 PM to 4 PM, the vehicle is in another active period, and energy consumption of the vehicle is determined as in act 216 and shown in curve 500.

From 4 PM to 10 PM, the vehicle is in another chargeable-dwell period, and because of energy consumption during active periods from 6 AM to 12 PM and from 2 PM to 4 PM, a battery of the vehicle is not full, and energy replenishment to the vehicle is simulated until 10 PM, at which point the battery of the vehicle is fully charged.

From 10 PM to 12 AM the next day and beyond, the vehicle is in a chargeable-dwell period, but the battery of the vehicle is full, and thus no further charging occurs. As a result, the "energy replenishable" to the vehicle battery during a chargeable-dwell period from 4 PM to 12 AM the next day and beyond corresponds to the amount of energy replenished from 4 PM to 10 PM.

"Energy replenishable" is not necessarily strictly limited by energy capacity of the battery, and can be limited by other factors as well. As one example, during a chargeable-dwell period, a battery of a vehicle may not be fully charged (e.g. the chargeable-dwell period is too short), thus limiting the energy replenishable during the chargeable-dwell period. This is shown in FIG. 6 and discussed below.

Figure 6:
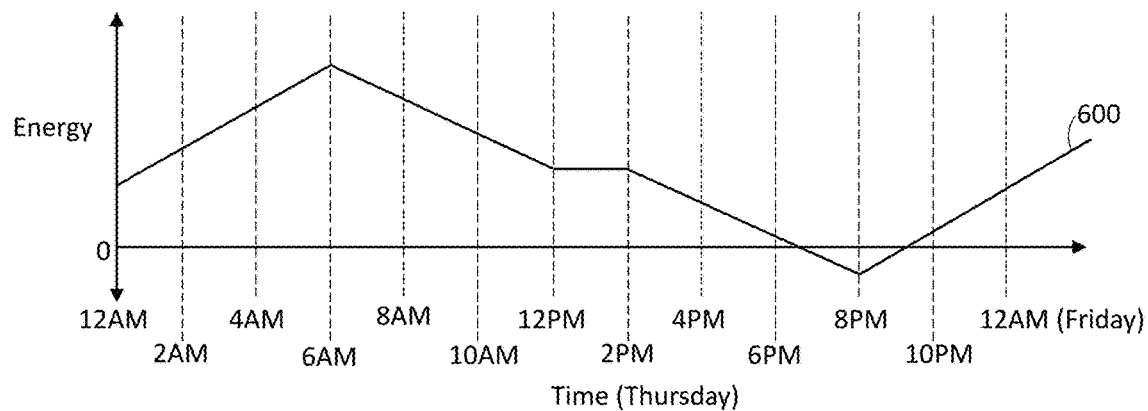

FIG. 6 is a plot diagram which shows an energy accumulator curve 600, which tracks energy consumption and energy replenishment to a vehicle simulated as a battery powered vehicle. In the illustrated example, energy curve 600 corresponds to energy consumed and replenished by the vehicle corresponding to the schedule shown in FIG. 4, for Thursday.

From 12 AM to 6 AM, the vehicle is in a chargeable-dwell period, and the vehicle battery is charged all the way until 6 AM. The battery is not fully charged during this chargeable-dwell period, and thus energy replenishable to the battery is limited by the duration of the chargeable-dwell period, rather than an energy capacity of the battery.

From 6 AM to 12 PM, the vehicle is in an active period, and energy consumption of the vehicle is determined as in act 216 and shown in curve 600.

From 12 PM to 2 PM, the vehicle is in a non-chargeable dwell period. That is, the vehicle is dwelling, but charging of the vehicle cannot or does not occur. As such, energy curve 600 is unchanged from 12 PM to 2 PM.

From 2 PM to 8 PM, the vehicle is in another active period, and energy consumption of the vehicle is determined as in act 216 and shown in curve 600. In the illustrated example, energy of the vehicle reaches 0 at about 6:15 PM, which highlights that in the illustrated scenario, the available chargeable dwell periods (at the simulated charge rate) are insufficient to accommodate the existing schedule for the vehicle on Thursday. Curve 600 is illustrated as going below 0, to illustrate how great an energy deficit exists for this scenario, but in alternative implementations the simulation can be limited such that simulated energy does not go below 0.

From 8 PM to 12 AM the next day and beyond, the vehicle is in another chargeable-dwell period, and because of energy consumption during active periods from 6 AM to 12 PM and from 2 PM to 8 PM, a battery of the vehicle is not full, and energy replenishment to the vehicle is simulated until 12 AM the next day and beyond.

The insufficient amount of energy replenishable shown in FIG. 6 can be assessed, evaluated, or resolved in different ways. In some cases, it can be determined that replacing the vehicle with the simulated battery-powered vehicle is not feasible. To address this, a different type of battery-powered vehicle, such as one with greater battery energy capacity, or with greater efficiency (less energy consumption during active periods) could be simulated, to determine if the Thursday Schedule can be accommodated with an alternate electric vehicle. In other cases, it can be determined that additional charging infrastructure is needed in order for the simulated battery-powered vehicle to be feasible. For example, if a dwell location of the vehicle from 12 PM to 2 PM every Thursday is consistent (e.g. the driver stops at the same location for lunch), a charging station could be installed at this dwell location. This would effectively convert the non-chargeable dwell period between 12 PM to 2 PM to a chargeable- dwell period, which may provide enough energy to get through the Thursday Schedule. In yet other cases, it can be determined that a schedule for the vehicle needs to be changed in order for the simulated electric vehicle to be feasible. For example, on Thursdays the driver could return the vehicle to a depot at some point between 6 AM and 8 PM, and could transfer to another vehicle which has more stored energy. In yet other cases, it can be determined that the charging rate during chargeable dwell periods can be increased (which could require additional infrastructure upgrades), in order to provide sufficient energy to the vehicle during the limited chargeable-dwell periods. Exactly what solution is best will be dependent on the specific scenario, and it may be that the solution is to not implement the battery-powered vehicle for this schedule.

FIGS. 5 and 6 illustrated simulated energy accumulators for a vehicle charging and expending energy. Each of these figures illustrates a single charge rate simulated for chargeable-dwell periods, but in practice a plurality of accumulators could be simulated, each accumulator with a different charge rate, to illustrate what an optimal charge rate would be for achieving desired energy replenishment, without over spending on infrastructure upgrades.

FIGS. 5 and 6 illustrate simulated energy accumulators where chargeable-dwell periods do not overlap with active periods of the vehicle. As discussed earlier, in some cases it is possible for a vehicle to simultaneously be in an active period and a chargeable-dwell period (e.g. when auxiliary systems of the vehicle are activated, and the vehicle is stationary at a candidate charge site). In such cases, the simulated energy accumulators can add a net energy replenishable during the overlapping time periods. That is, a difference between energy replenishable due to charging and energy consumption due to vehicle system use is added to a respective accumulator. If the simulated rate of charge exceeds the energy consumption, the net energy replenishable will be positive. On the other hand, if the energy consumption exceeds the simulated rate of charge, the net energy replenishable will be negative.

Returning to method 200 in FIG. 2, acts 221 and 222 grouped at 220 pertain to each candidate charge site of the one or more candidate charge sites.

At 221, energy replenishable to vehicles is determined, for chargeable-dwell periods in which the respective dwell location of said vehicle is at the candidate charge site. That is, based on energy-replenishable data or determinations such as those discussed above with reference to FIGS. 5 and 6, for a plurality of vehicles, expected energy-replenishable at each candidate charge-site is determined. In an exemplary implementation, energy-replenishable for a plurality of vehicles at the candidate charge site can be summed together, for each interval of time of interest. In the examples of FIGS. 4, 5, and 6, periods are separated in two-hour intervals. In this example as applied to candidate charge sites, energy replenishable to all vehicles which dwell at the candidate charge site for a given two-hour interval is summed, to determine a total energy replenishable by the candidate charge site for the two-hour interval. This can be performed for each time interval, to determine total energy replenishable by the candidate charge site over time. For implementations where a plurality of charge rates are simulated, a plurality of respective determinations can be made for energy replenishable by the candidate charge site, for the respective simulated charge rates.

At 222, supply requirement for the candidate charge site to provide at least the determined energy replenishable to vehicles during chargeable-dwell periods in which the respective dwell location of said vehicles is at the charge site is determined. The supply requirement can indicate infrastructure requirements required at the candidate charge site in order to provide the energy replenishment determined at 221.

In some implementations, determining the supply requirement comprises determining a required power supply at the candidate charge site to provide the determined energy replenishment to vehicles determined at 221. Examples of this are discussed below with reference to FIG. 7.

Figure 7:
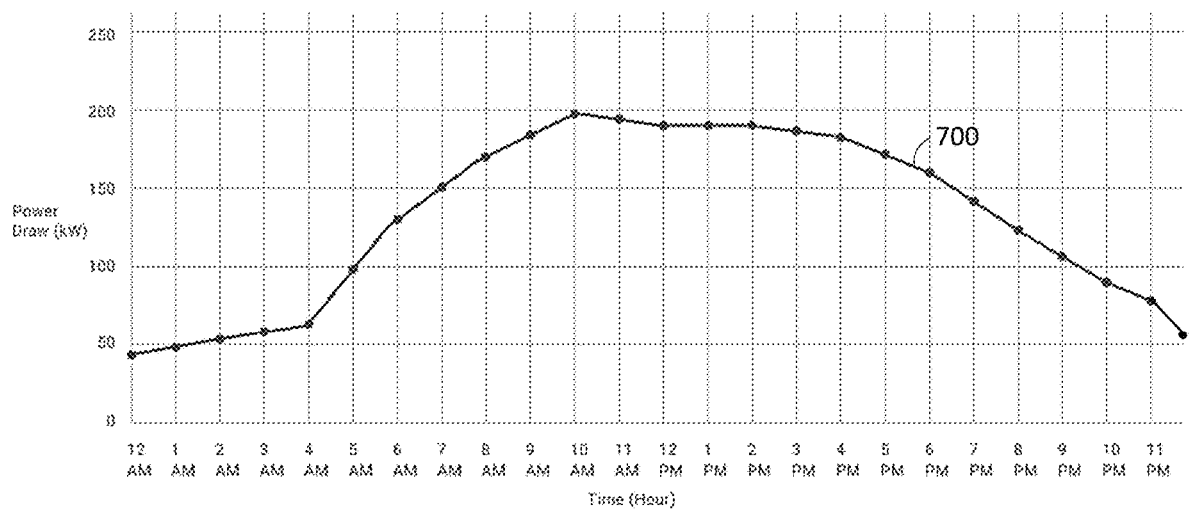
FIG. 7 is a plot diagram which illustrates power demand at a candidate charging site, in at least one exemplary scenario.

FIG. 7 is a plot diagram which illustrates power demand at a candidate charging site (as power demand curve 700), to provide energy replenishment to vehicles dwelling at the candidate charge site.

In one exemplary implementation, determining the supply requirement comprises determining a peak power demand at the candidate charge site to provide the energy replenishment to vehicles as determined at 221. As can be seen in FIG. 7, power demand peaks at 10 AM, with a demand of nearly 200 kW. This means that, in order to provide energy replenishment to vehicles in this implementation, nearly 200 kW of instantaneous power needs to be able to be supplied.

In another exemplary implementation, required power supply may be determined at a broader level to determine supply requirements. For example, a candidate may receive power from an electrical grid, which is limited to a certain maximum amount of power draw. This maximum amount of power draw may be less than (or unacceptably close to) the peak power demand such as that illustrated in FIG. 7. To address this, the candidate charging site can be equipped with at least one energy storage device (such as a large battery or collection of battery cells). These battery cells can be charged with power from the electrical grid, for delivery to vehicles as needed. In such an implementation, as long as the energy storage device can deliver sufficient instantaneous power to provide the required energy replenishment to the vehicles, power supply from the electrical grid does not need to meet the peak power draw. Rather, overall power supply from the grid needs only to meet overall power draw from the energy storage device. To this end, power supply over a broader time range needs only to meet power draw over the broader time range.

In one example, this broader time range can be selected as one day. With reference to the example illustrated in FIG. 7, total energy replenishment provided can be determined by summing power usage for each hour (i.e. by integrating under the illustrated power curve 700). In the example of FIG. 7, energy replenishment provided for the day is approximately 3200 kWh. With an appropriately sized energy storage device, the electric grid needs only to supply this amount of energy over the course of the day, which works out to an average power per hour of 134 kW. Assuming the electrical grid provides consistent power, the minimum power supply required would be 134 kW. If the energy storage device were undersized, greater power supply from the electrical grid could offset periods of high power draw from the energy storage device. Further, it is preferable to determine power supply with at least some buffer room to compensate for days of higher power draw, periods of lower power supplied by the electrical grid, or other unpredicted events.

FIG. 7 illustrates a single power demand curve 700, but in implementations where a plurality of charge rates are simulated as discussed above, a corresponding plurality of power demand curves could be generated, for each respective simulated charge rate.

In some implementations, determining the supply requirement comprises determining a required number of vehicles which simultaneously have chargeable-dwell periods with respective locations at a candidate charge site. In this implementation, determining the supply requirement comprises determining a number of vehicles which require simultaneous charging. That is, a required number of charging heads or chargers to connect to vehicles simultaneously is determined. Examples of this are discussed below with reference to FIGS. 8 and 9.

Figure 8:
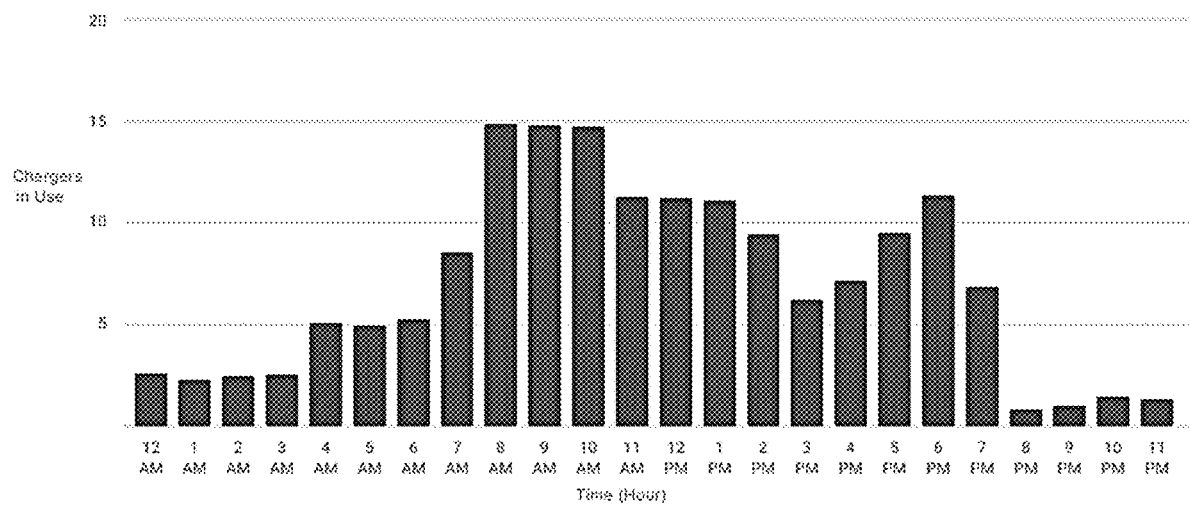
FIG. 8 is a plot diagram which illustrates a number of vehicles simultaneously dwelling at a candidate charge site, per hour, in at least one exemplary scenario.

FIG. 8 is a plot diagram which illustrates a number of vehicles simultaneously dwelling at a candidate charge site, per hour. As can be seen in FIG. 8, a maximum of 15 vehicles are simultaneously dwelling at the candidate charge site, such that 15 charge heads or charge stations can adequately provide energy replenishment to vehicles dwelling at the charge site.

Figure 9:
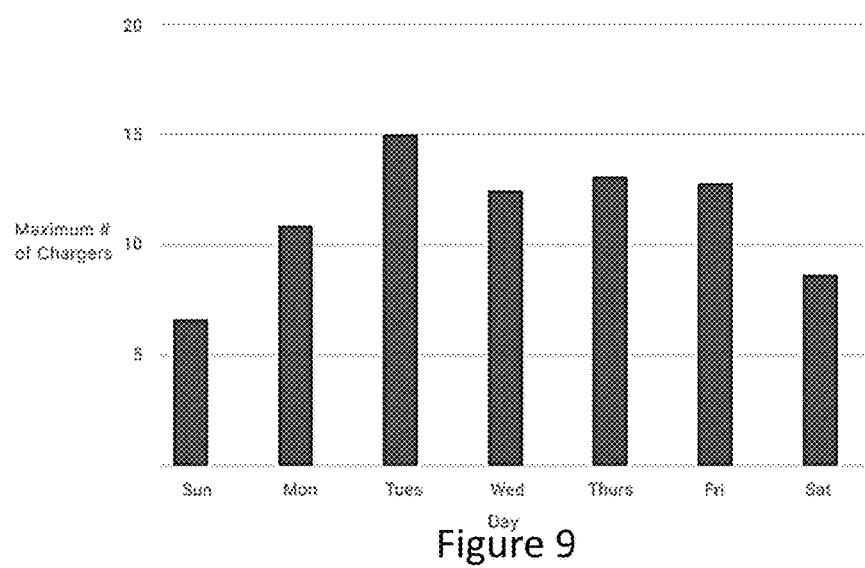
FIG. 9 is a plot diagram which illustrates a peak number of vehicles simultaneously dwelling at a candidate charge site, per day, in at least one exemplary scenario.

FIG. 9 is a plot diagram which illustrates a peak number of vehicles simultaneously dwelling at a candidate charge site, per day. As can be seen in FIG. 9, a maximum of 15 vehicles are simultaneously dwelling at the candidate charge site throughout the week, such that 15 charge heads or charge stations can adequately provide energy replenishment to vehicles dwelling at the charge site.

If actively switching vehicles connected to charge heads or charge stations at a candidate charge site is feasible (i.e., when a first vehicle is finished charging, a second vehicle is connected to the charge station or charge head the first vehicle was connected to, as opposed to waiting for the first vehicle to be moved for regular use), the number of required charge stations or charge heads could be reduced in some scenarios. This can be determined by differentiating between chargeable-dwell periods where a vehicle is charging, and chargeable-dwell periods where a vehicle is not charging. Such differentiation is shown in the exemplary schedule in FIG. 4.

Figure 10:
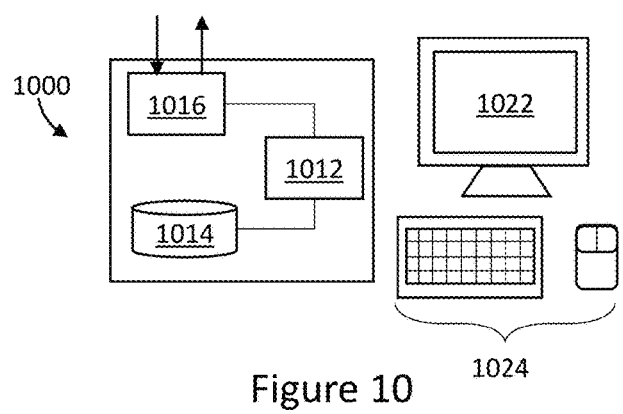
FIG. 10 is a schematic view of an exemplary device.

Candidate charge sites can be identified in order to identify chargeable-dwell periods at such candidate charge locations. In some implementations, candidate charge sites could be autonomously or algorithmically identified, as discussed later with reference to FIG. 11. In other implementations, an indication of a location of least one candidate charge site can be provided by an appropriate device. In some cases, this device could be a network device; for example, at least one depot location for a fleet could be stored on the network device, and the at least one depot location can be provided or received as an indication of a candidate charge site. In yet other implementations, an indication of a location of at least one candidate charge site can be received as user input to a user interface device. FIG. 10 illustrates an exemplary user interface device in this regard.

FIG. 10 is a schematic view of a device 1000, which could be used in any of the implementations discussed herein. For example, device 1000 could be used as management device 102 in FIG. 1, additional device 106 in FIG. 1, or as an interface device to provide input to these devices. Device 1000 as illustrated includes at least one processor 1012, at least one non-transitory processor-readable storage medium 1014, and a communication interface 1016. The non-transitory processor-readable storage medium 1014 can have processor-readable instructions stored thereon which, when executed by the at least one processor 1012 cause the device 1000 to perform any of the operations or methods described herein. Communication interface 1016 can be a wired or wireless interface, through which data and inputs can be provided to device 1000, and through which data and outputs can be provided by device 1000. For example, location data for a plurality of vehicles can be received from a telematics device or system by communication interface 1016, for processing and analysis by the at least one processor 1012. Resulting analysis can also be output by communication interface 1016.

FIG. 10 also illustrates exemplary input and output devices through which a user or operator can interact with device 1000. In particular, FIG. 10 shows a display 1022, which can display outputs from device 1000. Other output devices could be provided such as speakers, or any other appropriate output device. FIG. 10 also shows a keyboard and mouse 1024, which can be used to provide inputs to the device 1000, such as selection or indication of regions, or any other appropriate input. Other input devices could also be used, such as a touchscreen, microphone, trackpad, or any other appropriate input device. Although the input and output devices illustrated in FIG. 10 appear in the form of those used with a desktop computer, other forms of devices could also be used, such as portable devices like a laptop, smartphone, PDA, tablet, or any other appropriate device. Further, a device to which a user provides input and receives output can be remote from the device 1000. For example, the device including the at least one processor 1012, the at least one non-transitory processor-readable storage medium 1014, and the communication interface 1016 can be a server, which is remote from a workstation or device with which the user interacts.

Using an input device, such as that illustrated in FIG. 10, a user or operator can provide input which indicates a location of at least one candidate charge site. For example, a user could provide input which defines at least one zone for a depot or staging area for a fleet, and this at least one zone could be considered as a candidate charge site. A user could provide input indicating candidate charging sites of any type; for example a user could indicate locations such as delivery zones (locations where drivers travel to deliver items), residences of drivers, service locations used by drivers (such as restaurants or rest stops where drivers can stop for breaks), or any other appropriate type of location where there is potential for vehicles to be charged.

Figure 11:
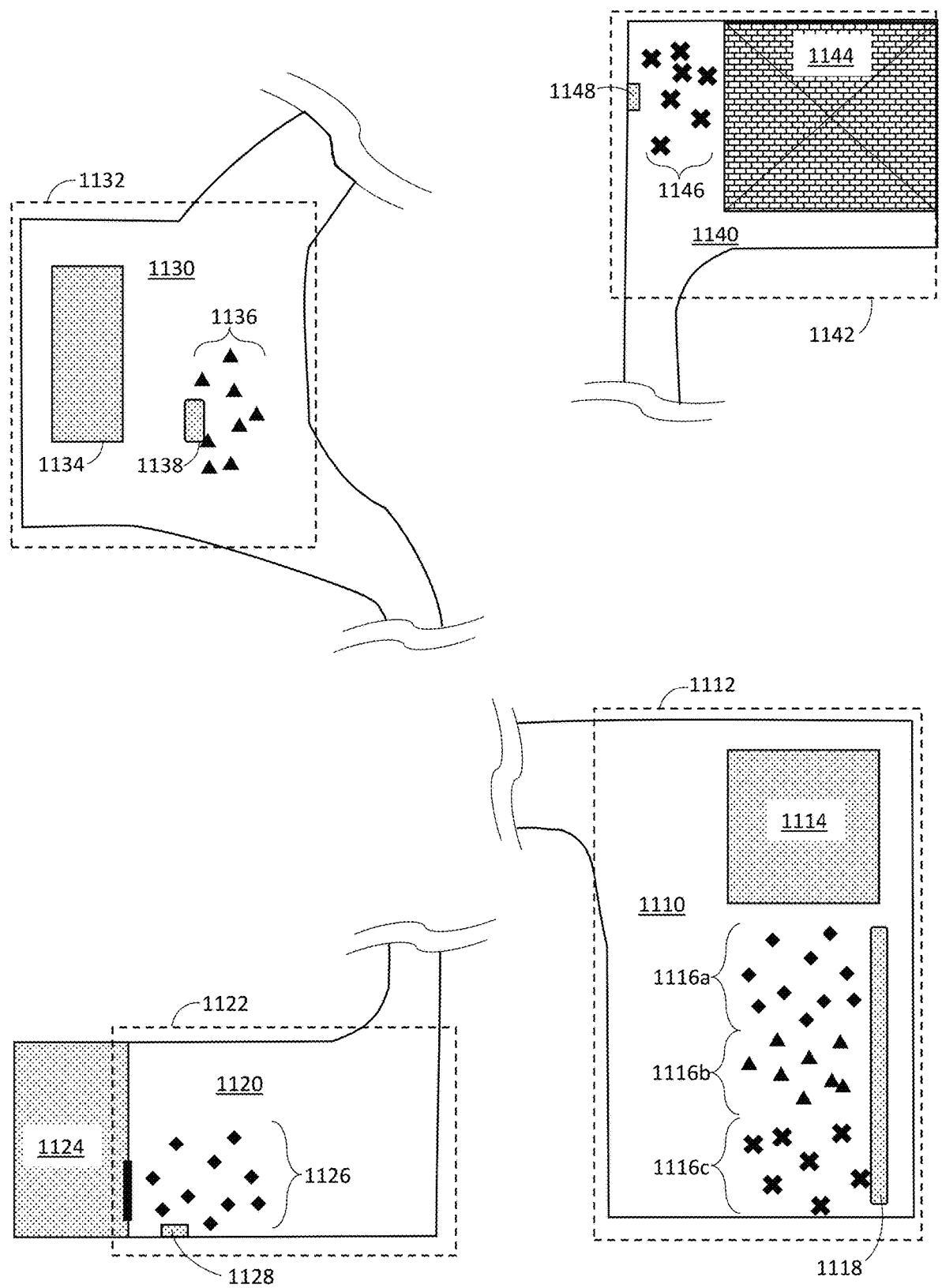
FIG. 11 is a top view of locations of candidate charge stations, in at least one exemplary scenario.

FIG. 11 is a top view of exemplary locations, to illustrate methodologies for identifying or determining candidate charge locations.

In the example, FIG. 11 shows a depot 1110, from which three vehicles are based. In practice, fewer or more vehicles could be based out of a depot, but three vehicles are discussed to illustrate principles for identifying candidate charge sites. Depot 1110 as illustrated has a building 1114 on site. Depot 1110 is illustrated as being identified by zone 1112. In some implementations, zone 1112 could for example be defined by a user using a user input device, as discussed above regarding FIG. 10. In other implementations, zone 1112 could be defined based on a clustering algorithm, which identifies zone 1112 based on it being a common location where vehicles of the fleet dwell. In this regard, FIG. 11 illustrates a plurality of instances location data 1116a for a first vehicle of the fleet (shown as diamond shapes), a plurality of instances of location data 1116b for a second vehicle of the fleet (shown as triangle shapes), and a plurality of instances of location data 1116c for a third vehicle of the fleet (shown as a plurality of x shapes). The difference in shapes for the location data does not indicate a difference in the format or type of the location data itself, but rather indicates a vehicle which the location data represents, to make understanding of FIG. 11 easier. By determining that zone 1112 is a common dwell location for the first, second, and third vehicles, zone 1112 (and thus depot 1110) can be identified as a candidate charge site for the fleet. In this way, candidate charge sites usable by multiple vehicles can be identified, and corresponding charge infrastructure (illustrated as charging station 1118) can be implemented.

The example of FIG. 11 also illustrates a delivery location 1120. Delivery location 1120 could for example be a customer site to where deliveries are taken, or a site owned by the entity which manages the fleet including the first, second, and third vehicles. Delivery location 1120 is shown as having a building 1124 on site. Delivery location 1120 is illustrated as being identified by zone 1122. In some implementations, zone 1122 could for example be defined by a user using a user input device, as discussed above regarding FIG. 10. In other implementations, zone 1122 could be defined based on a clustering algorithm, which identifies zone 1122 based on it being a location where at least one vehicle of the fleet dwells. In this regard, FIG. 11 illustrates a plurality of instances of location data 1126 for a first vehicle of the fleet. By determining that zone 1122 is a dwell location for the first vehicle, zone 1122 (and thus delivery location 1120) can be identified as a candidate charge site for the fleet. Although delivery location 1120 is only shown as being used by the first vehicle, it is possible that other vehicles of the fleet could also dwell at delivery location 1120. In this way, a candidate charge site usable by one or more vehicles of the fleet can be identified, and corresponding charge infrastructure (illustrated as charge station 1128) can be implemented if appropriate. For example, if the entity which manages the fleet also owns or manages delivery location 1120, the entity could choose to implement charge station 1128. As another example, the entity which manages the fleet can have or establish a relationship with an owner or manager of delivery location 1120, to implement charge station 1128. Under certain circumstances, charging of a vehicle at a delivery location can provide sufficient energy to a vehicle for continued operation of the vehicle that day. For example, if a delivery time is long (e.g. it takes a significant amount of time to unload the vehicle), charging the vehicle at the delivery location can be valuable.

The example of FIG. 11 also illustrates a service location 1130. Service location 1130 could for example be a restaurant or rest stop where drivers stop for breaks or meals. Service location 1130 is shown as having a building 1134 on site. Service location 1130 is illustrated as being identified by zone 1132. In some implementations, zone 1132 could for example be defined by a user using a user input device, as discussed above regarding FIG. 10. In other implementations, zone 1132 could be defined based on a clustering algorithm, which identifies zone 1132 based on it being a location where at least one vehicle of the fleet dwells. In this regard, FIG. 11 illustrates a plurality of instances of location data 1136 for a second vehicle of the fleet. By determining that zone 1132 is a dwell location for the second vehicle, zone 1132 (and thus service location 1130) can be identified as a candidate charge site for the fleet. Although service location 1130 is only shown as being used by the second vehicle, it is possible that other vehicles of the fleet could also dwell at service location 1130. In this way, a candidate charge site usable by one or more vehicles of the fleet can be identified, and corresponding charge infrastructure (illustrated as charge station 1138) can be implemented or used if appropriate. For example, the entity which manages the fleet can have or establish a relationship with an owner or manager of service location 1130, to implement charge station 1138. As another example, charge station 1138 may already exist, and the entity which manages the fleet may just have to account for the cost to charge vehicles at charge station 1138, or set up an agreement to use charge station 1138. Under certain circumstances, charging of a vehicle at a service location can provide sufficient energy to a vehicle for continued operation of the vehicle that day. For example, if drivers tend to take lunch at the service location (or are provided lunch at the service location), charging vehicles at the service location can be valuable.

The example of FIG. 11 also illustrates a residence 1140 for a driver of the third vehicle. Residence 1140 is shown as having a house 1144 on site. Residence 1140 is illustrated as being identified by zone 1142. In some implementations, zone 1142 could for example be defined by a user using a user input device, as discussed above regarding FIG. 10 (e.g. inputting a known address of the driver). In other implementations, zone 1142 could be defined based on a clustering algorithm, which identifies zone 1142 based on it being a location where at least one vehicle of the fleet dwells. In this regard, FIG. 11 illustrates a plurality of instances of location data 1146 for a third vehicle of the fleet. By determining that zone 1142 is a dwell location for the second vehicle, zone 1142 (and thus residence 1140) can be identified as a candidate charge site for the third vehicle. Identifying the zone 1142 as a candidate charge site can also account for other factors, such as time of day. For example, if the third vehicle is typically active during normal work hours (such as 9 AM to 5 PM), and then dwells at zone 1142 outside of those hours, zone 1142 could be identified as a candidate charging site on the basis that zone 1142 provides a consistent dwell location for the third vehicle when the vehicle is expected not to be used. In some implementations, zone 1142 could be specifically identified as a home or residence of the driver (which is useful for assessing feasibility of implementing charging infrastructure) by identifying zone 1142 as not corresponding to other zones used by the fleet (such as depots etc.), by determining that only one vehicle in the fleet dwells there, and/or by determining that the third vehicle only dwells there during non-work hours of the driver. In this way, a candidate charge site usable by a vehicle of the fleet can be identified, and corresponding charge infrastructure (illustrated as charge station 1148) can be implemented or used if appropriate. For example, the entity which manages the fleet can arrange and fund implementation of charge station 1148 at the residence 1140, and arrange to pay for electricity bills for charging of the third vehicle. As another example, charge station 1148 may already exist, and the entity which manages the fleet may just have to arrange to pay for charging of the third vehicle by the charge station 1148. Under certain circumstances, charging of a vehicle at a residence can provides advantages to charging the vehicle at a central depot. For example, power supply restrictions at the depot, or space restrictions for implementation of charging infrastructure at the depot, will not be applicable to charging at the residence (though the residence may be subject to its own restrictions in this regard).

Although FIG. 11 shows the first vehicle, the second vehicle, and the third vehicle dwelling at different locations 1120, 1130, and 1140, it is possible for each of the vehicles to dwell at other locations and use charge infrastructure. For example, the second and third vehicles could also make deliveries to delivery location 1120, and charge at charge station 1128. As another example, the first and third vehicles could also take breaks at service location 1130 and charge at charge station 1138. As yet another example, the first vehicle and the second vehicle could also park at respective driver's residences during off hours, and charge at respective charges stations thereat.

In addition to identifying candidate charge sites based on user input, or based on clustering of dwell locations for vehicles, candidate charge sites could also be identified based on existing data which originates from other purposes. For example, in a telematics system, depot locations, destination locations, and common stop locations may already be identified and stored (for example on non-transitory processor-readable storage medium 120 of management device 102 in FIG. 1, non-transitory processor-readable storage medium 160 of device 106 in FIG. 1, or another network device). Such already stored locations can be provided to or retrieved by a device which is performing method 200 (such as processor 122 of management device 102 or processor 162 of device 106).

Figures 12, 13:
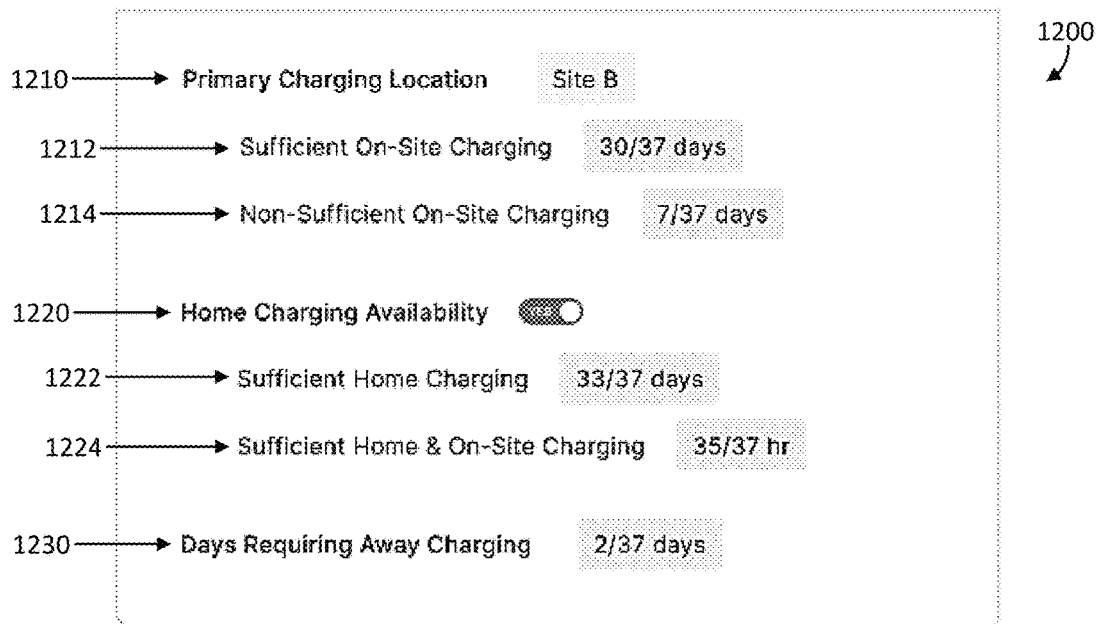
FIG. 12 illustrates a user interface which shows a summary for implementing a battery-powered vehicle, in at least one exemplary scenario.
FIG. 13 illustrates a user interface which shows a summary of vehicles for home charging consideration, in at least one exemplary scenario.

FIG. 12 illustrates a user interface 1200 which shows a summary of feasibility of implementing a particular battery-powered vehicle. Based on the results of determining energy consumption and energy replenishable in acts 216 and 217, as exemplified in the discussion of FIGS. 5 and 6, sufficiency of charging on a per-day basis is determined. As an example, the scenario illustrated in FIG. 5 represents a day where sufficient charging is received, whereas the scenario illustrated in FIG. 6 represents a day where sufficient charging is not received. In the example of FIG. 12, 37 days of operational data for a vehicle where analyzed, to determine whether sufficient charge can be provided to the vehicle at a candidate charge site, for each day.

User interface 1200 is shown as including a plurality of rows 1210, 1212, 1214, 1220, 1222, 1224, and 1230, which indicate different information. Row 1210 indicates a primary charging location (candidate charge site) for the vehicle, in this case "Site B", which could correspond to a depot, warehouse, or staging area for vehicles in the fleet. Row 1212 indicates the number of days where sufficient charging can be provided at "Site B", which in this case is 30 out of 37 days. Row 1214 indicates the number of days where sufficient charging cannot be provided at "Site B", which in this case is 7 out of 37 days.

Row 1220 indicates a selection of whether home charging is available for the vehicle, which can be toggled by an operator or user. "Home charging" refers to the availability of a driver of the vehicle to charge the vehicle at their residence, as discussed above with reference to FIG. 11. In example of FIG. 12, home charging is selected as available for the vehicle. Row 1222 indicates the number of days where sufficient charging can be provided by home charging, which in this case is 33 out of 37 days. Row 1224 indicates the number of days where sufficient charging can be provided by a combination of charging at home and at "Site B", which in this case is 35 out of 37 days. As an example of a combination of charging at home and charging at "Site B": a driver of the vehicle can take their vehicle home at night for charging, but still takes their vehicle to Site B at certain points during the day. For example, the driver may go to Site B at some point during the day, such as to load their vehicle with deliveries at Site B, or to take a break for lunch, or any other reason, during which time the vehicle could be charging.

Row 1230 indicates a number of days for which away charging is required, which in this case is 2 out of 37 days. In this context, "away charging" refers to stopping the vehicle at some point during the day to charge, which is outside of a normal work schedule. As an example, the driver may have to take the vehicle to a public charge station to charge, and may be on standby until the vehicle is sufficiently charged to carry on or complete the work day. Based on the number presented in row 1230, a fleet manager can make a decision as to whether implementing an electric vehicle in this situation is feasible or appropriate.

In cases where home charging is not available, the toggle in row 1220 is deselected, and the number indicated in row 1214 can be used by a fleet manager to decide whether implementing an electric vehicle in this situation is feasible or appropriate. When the toggle in row 1220 is deselected, row 1230 could be populated with the number from row 1214.

FIG. 13 illustrates a user interface 1300 which shows a summary of vehicles for which home charging is beneficial, required, or pertinent. That is, for the vehicles illustrated in interface 1300, charging at a primary location (candidate charge site) does not provide a sufficient amount of charge for every day, and therefore home charging should be evaluated. In FIG. 13, based on the results of determining energy consumption and energy replenishable in acts 216 and 217, as exemplified in the discussion of FIGS. 5 and 6, sufficiency of charging on a per-day basis is determined, similar to as discussed with reference to FIG. 12. In the example of FIG. 13, 37 days of operational data for three vehicles where analyzed, to determine whether sufficient charge can be provided to each vehicle at a respective candidate charge site, for each day. While FIG. 13 only illustrates three vehicles, data for any number of vehicles could be analyzed for presentation, as appropriate for a given application.

Column 1302 indicates an identification of each vehicle (in this case an identification number, but other forms of identification could be used, such as names, associated driver, or other appropriate identifiers). Column 1304 indicates a make, model, and year number of each vehicle.

Column 1306 indicates an EV type which is under consideration to replace each vehicle. In this case, each vehicle is being considered for replacement with a battery electric vehicle (BEV), alternately referred to as a fully-electric vehicle. In alternative scenarios, other types of battery-powered vehicle could be considered, such as plug-in hybrid electric vehicles (PHEVs), or extended-range electric vehicles (EREVs), as non-limiting examples. Column 1308 indicates a "recommended EV", or a specific model of battery powered vehicle for which operation is being simulated, in this case a Ford E-transit® 2018.

Column 1310 indicates a primary location where each vehicle is based (a candidate charge site). In the example of FIG. 13, each vehicle is based out of "Head Office", but in other scenarios vehicles could be based out of different locations. Column 1312 indicates a number of days each vehicle can receive sufficient charging at the primary location. Column 1314 indicates a number of days each vehicle can receive sufficient charging at a home charge site (i.e. at a residence of the driver as discussed with reference to FIG. 11 above). Column 1316 indicates a number of days each vehicle can receive sufficient charging with a combination of charging at the primary site and charging at a home of the driver, similar to as discussed above with reference to FIG. 12.

Column 1318 illustrates a toggle which a user can control to indicate for which vehicles home charging is available or feasible. In some implementations, the toggle could be purely visual, to visually mark vehicles for which home charging is an option or is not an option (e.g. such as by greying out vehicles for which home charging is not an option). In other implementations, the toggle could be used to remove vehicles from the list (e.g. vehicles for which home charging is not an option could be deleted from the list, or could be hidden from the interface 1300, to reduce clutter).

Based on the data presented in user interface 1300, a fleet manager can make decisions as to the feasibility of replacing certain vehicles with battery-powered vehicles, and what infrastructure needs to be present or implemented to support said battery-powered vehicles. Although FIGS. 12 and 13 show specific summary interfaces which can be presented to a user, operator, or fleet manager, other interfaces can also be presented. For example, any of the activity schedule in FIG. 4, or the plot diagrams of FIGS. 5, 6, 7, 8, and 9 could be presented, for review by users, operators, or fleet managers. Additionally, as another example, a summary list could also be presented which shows vehicles for which sufficient charging can be obtained every day, at specified locations, so that a fleet manager can readily identify exceptional candidate vehicles for implementation as battery-powered vehicles, and candidate charge sites where charge infrastructure is best implemented.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processor can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware.

What is claimed is:

1. A system for determining supply requirements for providing energy to a plurality of combustion-powered vehicles at one or more candidate charge sites, the system comprising:
   at least one processor;
   at least one non-transitory processor-readable storage medium communicatively coupled to the at least one processor, the at least one non-transitory processor-readable storage medium storing processor-executable instructions which when executed by the at least one processor, cause the system to:
   for each combustion-powered vehicle in the plurality combustion-powered vehicles:
      identify at least one dwell period of the combustion-powered vehicle;
      for each identified dwell period of the combustion-powered vehicle, determine a respective dwell location of the combustion-powered vehicle;
      identify at least one chargeable-dwell period, by identifying at least one dwell period of the combustion-powered vehicle where a respective dwell location of the combustion-powered vehicle is at a candidate charge site of the one or more candidate charge sites;
      identify at least one active period of the vehicle;
      for each active period of the combustion-powered vehicle, determine energy consumption by the combustion-powered vehicle as a battery-powered vehicle during the at least one active period of the combustion-powered vehicle, by simulating operation of the combustion-powered vehicle as a battery-powered vehicle, based on real world data collected from the combustion-powered vehicle; and
      determine energy replenishable to the combustion-powered vehicle during the at least one chargeable-dwell period; and
   for each candidate charge site of the one or more candidate charge sites:
      determine energy replenishable to combustion-powered vehicles during chargeable-dwell periods in which the respective dwell location of said combustion-powered vehicle is at the candidate charge site; and
      determine supply requirements for the candidate charge site to provide at least the determined energy replenishable to combustion-powered vehicles during chargeable-dwell periods in which the respective dwell location of said combustion-powered vehicles is at the candidate charge site.

2. The system of claim 1 wherein, for each candidate charge site of the one or more candidate charge sites: the processor-executable instructions which cause the system to determine supply requirements for the candidate charge site cause the system to: determine a required power supply at the candidate charge site to provide the determined energy replenishable to combustion-powered vehicles during chargeable-dwell periods with respective dwell locations at the candidate charge site.

3. The system of claim 1 wherein, for each candidate charge site of the one or more candidate charge sites: the processor-executable instructions which cause the system to determine supply requirements for the candidate charge site cause the system to: determine a peak power demand at the candidate charge site to provide the determined energy replenishable to combustion-powered vehicles during chargeable-dwell periods with respective dwell locations at the candidate charge site.

4. The system of claim 1 wherein, for each candidate charge site of the one or more candidate charge sites: the processor-executable instructions which cause the system to determine supply requirements for the candidate charge site cause the system to: determine a maximum number of combustion-powered vehicles which simultaneously have chargeable-dwell periods with respective dwell locations at the candidate charge site.

5. The system of claim 1 wherein for each combustion-powered vehicle in the plurality of combustion-powered vehicles: the processor-executable instructions which cause the system to identify the at least one dwell period of the combustion-powered vehicle cause the system to: identify each dwell period of the at least one dwell period as being a respective period of time where the combustion-powered vehicle is stationary.

6. The system of claim 5, wherein the processor-executable instructions when executed further cause the system to, for each combustion-powered vehicle in the plurality of combustion-powered vehicles, determine whether the com bustion-powered vehicle is stationary based on vehicle data selected from a group of vehicle data consisting of:
- location data;
- acceleration data; and
- motion data.

7. The system of claim 5, wherein for each combustion-powered vehicle in the plurality of combustion-powered vehicles: the processor-executable instructions which cause the system to determine a respective dwell location of the combustion-powered vehicle for each identified dwell period of the combustion-powered vehicle cause the system to: identify the respective location of the combustion-powered vehicle where the combustion-powered vehicle is stationary based on location data received from the combustion-powered vehicle.

8. The system of claim 1, wherein for each combustion-powered vehicle in the plurality of combustion-powered vehicles: the processor-executable instructions which cause the system to identify the at least one active period of the combustion-powered vehicle cause the system to: identify each active period of the at least one active period as being a respective period of time where the combustion-powered vehicle is in use.

9. The system of claim 8, wherein the processor-executable instructions when executed further cause the system to, for each combustion-powered vehicle in the plurality of combustion-powered vehicles, determine whether the combustion-powered vehicle is in use based on combustion-powered vehicle data selected from a group of vehicle data consisting of:
- location data;
- acceleration data;
- motion data; and
- vehicle system activation data.

10. The system of claim 1, wherein the processor-executable instructions when executed further cause the system to determine a respective location of at least one candidate charge site of the one or more candidate sites, by identifying a location where a plurality of dwell periods for at least a subset of the plurality of combustion-powered vehicles occur.

11. The system of claim 1, wherein the processor-executable instructions when executed further cause the system to receive an indication of a respective location of at least one candidate charge site of the one or more candidate charge sites.

12. The system of claim 11, wherein the processor-executable instructions which cause the system to receive an indication of a respective location of at least one candidate charge site of the one or more candidate charge sites cause the system to:
receive the respective location as user-provided input.

13. The system of claim 11, wherein the processor-executable instructions which cause the system to receive an indication of a respective location of at least one candidate charge site of the one or more candidate charge sites cause the system to:
receive the respective location from a network device.

14. The system of claim 1, wherein the processor-executable instructions when executed further cause the system to, for each combustion-powered vehicle in the plurality of combustion-powered vehicles:
identify a first candidate charge site by identifying a first dwell location where the combustion-powered vehicle spends more time dwelling than at locations outside the first dwell location.

15. The system of claim 14, wherein the processor-executable instructions when executed further cause the system to, for each combustion-powered vehicle in the plurality of combustion-powered vehicles:
identify a second candidate charge site by identifying a second dwell location where the combustion-powered vehicle spends more time dwelling than at locations outside the second dwell location.

16. The system of claim 1, wherein the processor-executable instructions when executed further cause the system to, for each combustion-powered vehicle in the plurality of combustion-powered vehicles: identify whether the energy replenishable to the combustion-powered vehicle compensates for the determined energy consumption by the combustion-powered vehicle as a battery-powered vehicle.

17. The system of claim 16, wherein, for each combustion-powered vehicle in the plurality of combustion-powered vehicles:
the processor-executable instructions which cause the system to identify at least one active period of the combustion-powered vehicle and identify at least one chargeable-dwell period of the combustion-powered vehicle cause the system to: identify an activity schedule for the combustion-powered vehicle which includes each chargeable-dwell period and each active period of the combustion-powered vehicle within a time frame; and the processor-executable instructions which cause the system to identify whether the energy replenishable to the combustion-powered vehicle compensates for the energy consumption by the combustion-powered vehicle as a battery-powered vehicle cause the system to: determine whether energy replenishable to the combustion-powered vehicle during each chargeable-dwell period provides sufficient energy for at least one active period of the combustion-powered vehicle between chargeable-dwell periods.

18. The system of claim 17, wherein for each combustion-powered vehicle in the plurality of combustion-powered vehicles the processor-executable instructions which cause the system to identify the activity schedule for the combustion-powered vehicle cause the system to identify the activity schedule as further including each dwell period which is not a chargeable-dwell period.

19. The system of claim 1, further comprising a plurality of telematic monitoring devices respectively included in each combustion-powered vehicle of the plurality of combustion-powered vehicles, wherein:
the processor-executable instructions when executed further cause the system to collect, by the plurality of telematic monitoring devices, respective telematics data for each combustion-powered vehicle of the plurality of combustion-powered vehicles; and
the processor-executable instructions which cause the system to, for each combustion-powered vehicle in the plurality of combustion-powered vehicles, identify at least one dwell period of the combustion-powered vehicle, determine a respective dwell location of the combustion-powered vehicle, identify at least one chargeable-dwell period, identify at least one active period of the combustion-powered vehicle, determine energy consumption by the combustion-powered vehicle as a battery-powered vehicle, and determine energy replenishable to the combustion-powered vehicle, are based on the respective telematics data collected for each combustion-powered vehicle in the plurality of combustion-powered vehicles.

20. The system of claim 1, further comprising at least one sensor respectively integrated in each combustion-powered vehicle of the plurality of combustion-powered vehicles, wherein:
the processor-executable instructions when executed further cause the at least one sensor to collect respective telematics data for each combustion-powered vehicle of the plurality of combustion-powered vehicles; and
the processor-executable instructions which cause the system to, for each combustion-powered vehicle in the plurality of combustion-powered vehicles, identify at least one dwell period of the combustion-powered vehicle, determine a respective dwell location of the combustion-powered vehicle, identify at least one chargeable-dwell period, identify at least one active period of the combustion-powered vehicle, determine energy consumption by the combustion-powered vehicle as a battery-powered vehicle, and determine energy replenishable to the combustion-powered vehicle, are based on the respective telematics data collected for each combustion-powered vehicle in the plurality of combustion-powered vehicles.

21. The system of claim 1, wherein the real-world operational data collected from the combustion-powered vehicle comprises data selected from a group of real-world operational data consisting of:
distance travelled by the combustion-powered vehicle;
elevation changes of the combustion-powered vehicle;
acceleration events of the combustion-powered vehicle;
deceleration events of the combustion-powered vehicle; and
vehicle accessory systems activation data.

22. The system of claim 1, wherein the processor-executable instructions which cause the system to, for each combustion-powered vehicle in the plurality of combustion-powered vehicles, determine energy replenishable to the combustion-powered vehicle during the at least one chargeable-dwell period cause the system to: simulate energy replenishable to the combustion-powered vehicle as a battery-powered vehicle.

23. The system of claim 22, further comprising, for each combustion-powered vehicle in the plurality of combustion-powered vehicles, tracking determined energy consumption and determined energy replenishable to a combustion-powered vehicle simulated as a battery-powered vehicle with an energy accumulator.

\* \* \* \* \*